US012562085B2

(12) United States Patent (10) Patent No.: US 12,562,085 B2

Choi et al. (45) Date of Patent: Feb. 24, 2026

(54) HEAD-MOUNTED DISPLAY DEVICE AND METHOD FOR CONTROLLING THE SAME

(71) Applicant: SAMSUNG ELECTRONICS CO., LTD., Suwon-si (KR)

(72) Inventors: Keeeun Choi, Suwon-si (KR); Joayoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/812,633

(22) Filed: Aug. 22, 2024

(65) Prior Publication Data

US 2025/0124829 A1 Apr. 17, 2025

Related U.S. Application Data

(63) Continuation of application No. PCT/KR2024/011955, filed on Aug. 12, 2024.

(30) Foreign Application Priority Data

Oct. 12, 2023 (KR) ........................ 10-2023-0135691

(51) Int. Cl.
 *G09G 3/00* (2006.01)
 *G06F 3/01* (2006.01)
(52) U.S. Cl.
 CPC ............. *G09G 3/001* (2013.01); *G06F 3/013* (2013.01); *G09G 2320/0686* (2013.01); *G09G 2354/00* (2013.01)
(58) Field of Classification Search
 CPC ......... G06G 3/001; G06F 3/013; G06F 3/011; G09G 2310/0686; G09G 2354/00; G09G 3/001; G09G 2320/0686
 See application file for complete search history.

(56) References Cited

U.S. PATENT DOCUMENTS 9,952,433 B2 * 4/2018 Um ...................... G06F 3/0481
10,650,602 B2 5/2020 You et al.
(Continued)

FOREIGN PATENT DOCUMENTS

CN 117953132 A * 4/2024 .............. G06T 7/50
CN 119576128 A * 3/2025
(Continued)

OTHER PUBLICATIONS

International Search Report and Written Opinion dated Nov. 8, 2024, issued by the International Searching Authority in International Application No. PCT/KR2024/011955.

*Primary Examiner* — Ricardo Osorio
(74) *Attorney, Agent, or Firm* — Sughrue Mion, PLLC

(57) ABSTRACT

A method performed by a head mounted display (HMD) device includes: determining a sleep onset preparation start time; and displaying, on a display, a sleep onset preparation screen to which a visual effect is applied, from the sleep onset preparation start time, in a stepwise manner during a sleep onset preparation time interval, where the visual effect that is applied in the stepwise manner comprises a visual effect of switching a virtual screen output through an entire display area of the display to a video see through (VST) screen, where the VST screen displays the virtual screen with a non-virtual screen as a background in the entire display area of the display, where the non-virtual screen is based on an image captured through a front camera, and where the virtual screen is based on content executed by the HMD device.

20 Claims, 31 Drawing Sheets

(56) References Cited

U.S. PATENT DOCUMENTS

| | | | | |
|---|---|---|---|---|
| 11,632,454 B2 * | 4/2023 | Huang | .................. | G06F 3/0346 |
| | | | | 715/863 |
| 2017/0011210 A1 * | 1/2017 | Cheong | .................. | A61B 5/681 |
| 2017/0293356 A1 * | 10/2017 | Khaderi | .................. | A61B 3/113 |
| 2019/0139321 A1 * | 5/2019 | Kocharlakota | ......... | G06F 3/011 |
| 2019/0385506 A1 | 12/2019 | Andrivon et al. | | |
| 2022/0091565 A1 | 3/2022 | Raymann et al. | | |
| 2023/0120187 A1 | 4/2023 | Uhm et al. | | |

FOREIGN PATENT DOCUMENTS

| | | | | | |
|---|---|---|---|---|---|
| EP | 3 584 784 A1 | 12/2019 | | | |
| JP | 2010-187132 A | 8/2010 | | | |
| JP | 2022-170475 A | 11/2022 | | | |
| KR | 10-2015-0026336 A | 3/2015 | | | |
| KR | 10-2017-0115367 A | 10/2017 | | | |
| KR | 10-2017-0118609 A | 10/2017 | | | |
| KR | 10-2020-0082487 A | 7/2020 | | | |
| KR | 10-2022-0008118 A | 1/2022 | | | |
| KR | 10-2485591 B1 | 1/2023 | | | |
| KR | 10-2023-0056392 A | 4/2023 | | | |
| KR | 102656528 B1 * | 4/2024 | ............. | G02B 30/34 |
| KR | 20250065914 A * | 5/2025 | ............. | G06T 19/20 |

* cited by examiner

HEAD-MOUNTED DISPLAY DEVICE AND METHOD FOR CONTROLLING THE SAME

CROSS-REFERENCE TO RELATED APPLICATIONS

This application is a continuation application, claiming priority under § 365 (c), of International application No. PCT/KR2024/011955 filed on Aug. 12, 2024, which is based on and claims the benefit of a Korean patent application number 10-2023-0135691, filed on Oct. 12, 2023, in the Korean Intellectual Property Office, the disclosures of which is incorporated by reference herein in its entirety.

BACKGROUND

1. Field

The disclosure relates to a head-mounted display device and a method for controlling the same to lead to sleep onset.

2. Description of Related Art

Wearable devices are electronic devices developed in a form that may be worn by a user, such as clothes, shoes, glasses, a watch, or a ring. The wearable device may include a head-mounted display (HMD) device. The HMD device may be used as a display device. The HMD device may also be called a face mounted display (FMD) device.

The HMD device was initially developed for military use but has also been commercialized for the general public based on augmented reality (AR), virtual reality (VR), or video see through (VST). For example, the HMD device is applied to a goggle-type display, that may be worn on the head to be used as an interface device, that allows the user to perform tasks or play a game while wearing the device.

If a user falls asleep while wearing an HMD device, vision stimulation (e.g., display screen) or auditory stimulation (e.g., audio output through a speaker, provided by a content service, may interfere with falling asleep and/or obtaining a deep sleep.

SUMMARY

According to an aspect of the disclosure, a method performed by a head mounted display (HMD) device includes determining a sleep onset preparation start time; and displaying, on a display, a sleep onset preparation screen to which a visual effect is applied, from the sleep onset preparation start time, in a stepwise manner during a sleep onset preparation time interval, in which the visual effect that is applied in the stepwise manner comprises a visual effect of switching a virtual screen output through an entire display area of the display to a video see through (VST) screen, in which the VST screen displays the virtual screen with a non-virtual screen as a background in the entire display area of the display, in which the non-virtual screen is based on an image captured through a front camera, and in which the virtual screen is based on content executed by the HMD device.

According to an aspect of the disclosure, a head mounted display (HMD) device includes at least one memory storing one or more instructions; at least one sensor; at least one camera; a display; and at least one processor including a processing circuit, the at least one processor operatively coupled to the to the at least one sensor, the at least one camera, the display, and the at least one memory, where the one or more instructions, when executed by the at least one processor, cause the HMD device to: determine a sleep onset preparation start time, display, on the display, a sleep onset preparation screen to which a visual effect is applied, from the sleep onset preparation start time, in a stepwise manner during a sleep onset preparation time interval, where the visual effect that is applied in the stepwise manner comprises a visual effect of switching a virtual screen output through an entire display area of the display to a video see through (VST) screen, where the VST screen displays the virtual screen with a non-virtual screen as a background in the entire display area of the display, where the non-virtual screen is based on an image captured through a front camera, and where the virtual screen is based on content executed by the HMD device.

According to one or more embodiments, a non-transitory computer readable medium having instructions stored therein, which when executed by a processor in a head mounted display (HMD) device cause the processor to execute a method including: determining a sleep onset preparation start time; and displaying, on a display, a sleep onset preparation screen to which a visual effect is applied, from the sleep onset preparation start time, in a stepwise manner during a sleep onset preparation time interval, in which the visual effect that is applied in the stepwise manner comprises a visual effect of switching a virtual screen output through an entire display area of the display to a video see through (VST) screen, in which the VST screen displays the virtual screen with a non-virtual screen as a background in the entire display area of the display, in which the non-virtual screen is based on an image captured through a front camera, and in which the virtual screen is based on content executed by the HMD device.

BRIEF DESCRIPTION OF THE DRAWINGS

The above and other aspects, features, and advantages of certain embodiments of the disclosure will be more apparent from the following description taken in conjunction with the accompanying drawings, in which.

The same or similar reference denotations may be used to refer to the same or similar elements throughout the specification and the drawings.

DETAILED DESCRIPTION

Figure 1:
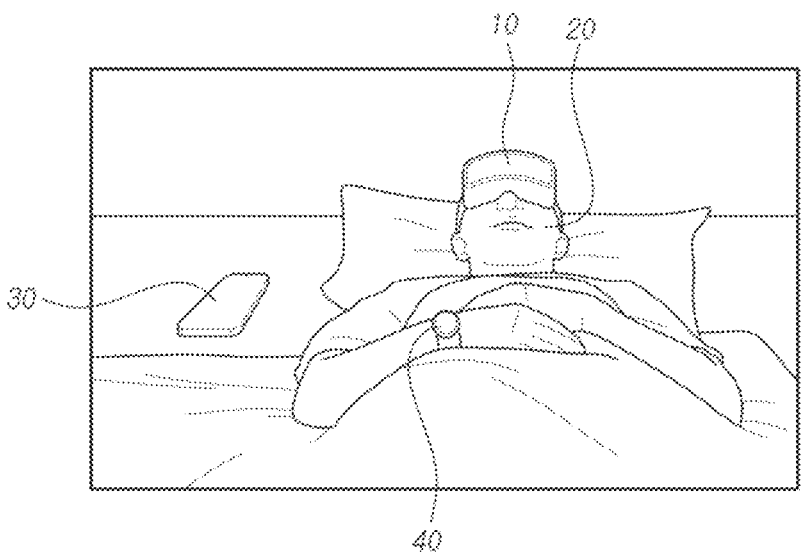
FIG. 1 is a view illustrating a use example of an HMD device according to one or more embodiments.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings.

According to one or more embodiments, there may be provided an HMD device and a method for controlling the same, to induce a user to reach sleep onset state by changing, in a stepwise manner, external stimulation based on a predicted (e.g. determined) sleep onset time of a user.

According to one or more embodiments, the HMD device may reduce, in a stepwise manner, external stimulation such as visual or auditory stimulation based on the user's predicted sleep onset time, thereby providing a sleep environment in which the user may have high-quality sleep.

The technical objects of the disclosure are not limited to the foregoing, and other technical objects may be derived by one of ordinary skill in the art from example embodiments of the disclosure.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from example embodiments of the disclosure.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a view illustrating a use example of an HMD device according to various embodiments.

Referring to FIG. 1, the HMD device 10 may be a device that the user 20 may wear on his/her head. In the disclosure, "user" or "wearer" may be interchangeably used as a term referring to a person wearing the HMD device 10. In one or more examples, the HMD device 10 may include a strap wrapped around the user's head for fixing the HMD to the user's head. In one or more examples, the HMD device 10 may be worn in a similar manner as a pair of glasses. The wearer 20 may use (e.g., execute) a desired content service after wearing the HMD device 10. The content service may be, for example, a service providing content such as a game or a movie. The content service may be a streaming content service. Various embodiments, in addition to the HMD device 10 being worn on the head by the user 20, other devices capable of receiving visual information through a display while the user 20 is wearing the HMD device 10 may be applied equally or with a slight modification. For example, various embodiments may be applicable to an electronic device that may be worn by the user 20, such as an earphone, a headset, glasses, or a fisheye lens, in addition to the HMD device 10. In the following description, the term "electronic device 10" will be used to apply various embodiments. The electronic device 10 may have a technical meaning referring not only to the HMD device 10, but also to a device to which various embodiments may be applied.

For the wearer 20, external stimulation, such as visual or auditory stimulation, may affect the quality and/or amount of sleep. Therefore, in order to provide the wearer 20 with a desired sleep quality and/or amount, it may be preferable to stop the service (e.g., turn off or pause) by the electronic device 10 and darken (e.g., lower) the lighting so as to reduce the degree to which the wearer 20 is exposed to external stimulation.

The electronic device 10 may determine and/or obtain a time when the wearer 20 starts preparing for sleep onset. In one or more examples, sleep onset may be a transition from being awake to falling asleep. Sleep onset may involve multiple sub-stages. Sleep onset may be characterized by changes in subjective, behavioral, cognitive, and physiological levels. Sleep onset may lead to non-rapid eye movement (NREM) sleep, but it can also transit directly to rapid eye movement (REM) sleep in some circumstances. The sleep onset preparation start time indicates a time when a sleep onset preparation operation of gradually or stepwise reduction of external stimulation is started to lead to sleep onset of the wearer 20. The external stimulation may be stimulation that may affect the wearer 20 as the electronic device 10 provides a content service. The external stimulation may be an input of information through one or more senses included one or more of the five (5) senses (e.g., visual, auditory, olfactory, taste, and tactile senses) that the wearer 20 may feel (e.g., experience). Visual stimulation and/or auditory stimulation may be typical of the stimulation that the wearer 20 may receive due to the operation of the electronic device 10. The visual stimulation may be stimulation (e.g., glare) applied to the eyes of the wearer 20 by a screen output through the display. The visual stimulation may be reduced, gradually or in a stepwise manner, by adjusting at least one requirement for screen display, such as the brightness (e.g., illuminance), size or color of the display area. Hereinafter, for convenience of description, the term "gradual," "stepwise," or "step" will be used to collectively describe a degree of reduction of external stimulation (e.g., a visual effect or an auditory effect). For example, a change of a parameter, in a stepwise manner, may refer to changing the parameter (e.g., volume or illuminance) by a predetermined amount for a predetermined determination. For example, a reduction of volume, in a stepwise manner, may refer to reducing a volume of a content service by 3 dB every 10 seconds for one (1) full minute.

According to one or more embodiments, the electronic device 10 may obtain the sleep onset preparation start time based on a sleep onset target time or a wake-up target time of the wearer 20. The sleep onset target time may be a target time set by the wearer 20 in another electronic device (e.g., the smartphone 30 or the smart watch 40) for sleep onset. The sleep onset target time may be set for a sleep onset alarm. The wake-up target time may be a target time set by the wearer 20 in other electronic device 30 or 40 for sleep offset. The wake-up target time may be set for a wake-up alarm. If the wearer 20 sets the target sleep time for the other electronic device (30 or 40), the electronic device 10 may obtain the sleep onset preparation start time based on one of the sleep onset target time or the wake-up target time according to the target sleep time. The target sleep time may be a time period (e.g., time interval) from the sleep onset target time to the wake-up target time.

The electronic device 10 may obtain the sleep onset preparation start time by at least one of a set sleep onset target time or the sleep onset target time predicted based on the wake-up target time and the sleep onset preparation time (e.g., time interval). The sleep onset preparation time interval may be the entire time for the electronic device 10 to apply the visual effect in a stepwise manner. For example, assuming that sleep onset target time is 8 p.m. and sleep onset preparation time interval is 20 minutes, the electronic device 10 may determine (or obtain) 7:40 p.m. as the sleep onset preparation start time considering 20 minutes, which is sleep onset preparation time interval, with respect to 8 μm. For example, assuming that the target sleep time is 8 hours, the wake-up target time is 6 a.m., and sleep onset preparation time interval is 20 minutes, the electronic device 10 may determine or obtain 9:40 p.m. as the sleep onset preparation start time based on a sleep onset preparation time interval of 20 minutes, with respect to 10 p.m., which is the time 8 hours before 6 a.m. If both the sleep onset target time and the wake-up target time are provided, the electronic device 10 may obtain the sleep onset preparation start time by assigning priority to sleep onset target time.

According to one or more embodiments, the electronic device 10 may obtain the sleep preparation start time based on sleep data recorded for the wearer 20. The electronic device 10 may collect, for example, sleep data of the wearer 20 from a wearable device 40, such as a smart watch worn, by the wearer 20. In one or more examples, the sleep data may provide an estimate of a user sleeping based on movement or a heart rate of the user. For example, if the user's movement is below a movement threshold for a predetermined period of time or the user's heart rate is below a heart rate threshold for the predetermined period of time, the user may be determined to be asleep. In one or more examples, if it is analyzed that the predicted sleep onset time of the wearer 20 is 10 p.m. based on the sleep data, the electronic device 10 may determine or obtain 9:40 p.m. as the sleep onset preparation start time based on a sleep onset preparation time interval of 20 minutes with respect to 10 μm. For example, if the predicted sleep time of the wearer 20 is eight (8) hours and the predicted wake-up time is 6 a.m. by analyzing the sleep data, the electronic device 10 may determine or obtain 9:40 p.m. as the sleep onset preparation start time based on a sleep onset preparation time interval of 20 minutes with respect to 10 p.m., which is eight (8) hours before 6 a.m.

According to one or more embodiments, the electronic device 10 may determine that the sleep onset preparation start time has arrived based on the measurement of the fatigue level satisfying a predetermined threshold level. For example, if the fatigue level obtained by the fatigue measurement reaches the predetermined threshold level, the electronic device 10 may determine that the sleep onset start time has arrived (e.g., started). In one or more examples, the electronic device 10 may measure the fatigue level of the wearer 20. The electronic device 10 may periodically or aperiodically measure the fatigue level of the wearer 20. In order to periodically measure the fatigue level, the electronic device 10 may configure a predetermined period for measuring the fatigue level. In order to aperiodically measure the fatigue level, the electronic device 10 may monitor the occurrence of an aperiodic event. The aperiodic event may be, for example, a movement in which the wearer 20 suddenly moves his head down and up. This movement may be detected by a sensing (e.g., detecting) signal by at least one sensor.

The electronic device 10 may adjust the sleep onset preparation start time based on the measured fatigue level. As an example, the electronic device 10 may change the sleep onset preparation start time by an amount proportional to an increase or decrease in fatigue level. For example, if the adjustment time unit is 10 minutes, the electronic device 10 may reduce the sleep preparation time by 10 minutes if the fatigue level increases by a threshold value. For example, if the sleep onset preparation start time is 9:40 μm and the fatigue level increases by the threshold value, the electronic device 10 may change the sleep onset preparation start time to 9:30 pm. If the fatigue level additionally increases by the threshold value, the electronic device may change the sleep onset preparation start time to 9:20 pm. For example, if the sleep onset preparation start time is 9:40 p.m. and the fatigue level decreases by the threshold value, the electronic device 10 may change the sleep onset preparation start time to 9:50 p.m.

To measure the fatigue level, the electronic device 10 may measure a duration in which eyes of the wearer 20 are closed, a number of blinks of the wearer 20, a pupil diameter of the wearer 20, an eyeball surface temperature of the wearer 20, or the heart rate variability of the wearer 20. The electronic device 10 may measure the duration of at least one of the eyes closed, the number of blinks, the pupil diameter, or the eyeball surface temperature of the wearer 20 based on the signal sensed by at least one sensor. The electronic device 10 may measure the heart rate variability of the wearer 20 based on information provided from the wearable device 40 worn by the wearer 20. The electronic device 10 may obtain a fatigue level value indicating the fatigue level based on the duration of at least one of the eyes closed, the number of blinks, the pupil diameter, the eyeball surface temperature, or the heart rate variability.

The electronic device 10 may display, through the display, a message indicating whether to start the sleep onset preparation when it is time to start the sleep onset preparation. For example, the above message may be "It's time to get ready to sleep. Run sleep onset preparation mode?" In one or more examples, the guide message may be "The fatigue level is high. Run fatigue level minimize mode?" The electronic device 10 may display a button (e.g., "Yes" button) for instructing to execute the sleep onset preparation mode and/or a button (e.g., "No" button) for instructing not to execute the sleep onset preparation mode through the display. The electronic device 10 may determine whether to execute the sleep onset preparation mode based on the interaction with the wearer 20.

The electronic device 10 may stepwise reduce external stimulation that may improve the sleep quality or depth of the wearer 20 for a predetermined time (e.g., the sleep preparation time) at the sleep onset preparation start time. The method for stepwise reducing the external stimulation may be determined, for example, based on the type of content service being used by the wearer 20. The method for reducing, in a stepwise manner, the external stimulation may be determined based on, for example, the display mode being applied to the display. Accordingly, the electronic device 10 may provide a sleep environment (e.g., a virtual environment) in which it is easy for the wearer 20 to switch to sleep onset. For example, the electronic device 10 may output, through the display, a sleep onset preparation screen to which a visual effect capable of reducing, in a stepwise manner, visual stimulation based on the passage of time is applied. The electronic device 10 may apply a visual effect of switching the virtual screen (e.g., a virtual screen according to an immersion mode) output through the entire display area of the display to a VST screen (e.g., a virtual screen according to a partial immersion mode) to the sleep onset preparation screen. The immersion mode for outputting the virtual screen through the entire display area of the display may be, for example, a VR mode. In the VR mode, the electronic device 10 may output the screen through the display in a 360-shielded type. In one or more examples, the VST screen is a screen that may be output through the display according to switching from the immersion mode to the partial immersion mode. The VST screen, according to the partial immersion mode, may reduce the visual immersion of the wearer 20 to reduce the activation of the sympathetic nerve (e.g., nerve responsible for responding to dangers or stressful situations). The visual immersion level may be proportional to the size of the screen output through the display. The immersion level may increase, for example, as the size of the screen increases and may decrease as the size of the screen decreases.

The VST screen may be a screen which includes a virtual scene (or screen) with a real scene (or screen) (e.g., non-virtual scene or screen) as a background. The VST screen may be a full screen displayed on the entire display area of the display. The real screen may be a screen created based on an image obtained by photographing a real space (e.g., space or place including objects) through a front camera. The virtual screen may be a screen created based on a content service being used by the user wearing the electronic device 10. In one or more examples, the electronic device 10 outputs a VST screen through the display to maintain a visual sense of reality to be provided by the content service considering an object included in the virtual screen or an attribute of the object included in the real screen. In this regard, the VST screen may maintain one or more objects of the content service to avoid an abrupt disruption to the viewing of the content service, thereby preventing the wearer from becoming alert.

If the visual effect is applied to the VST screen in a stepwise manner, the electronic device 10 may reduce, in a stepwise manner, the proportion of the virtual screen occupied in the VST screen over time. The electronic device 10 may reduce, in a stepwise manner, the size of the virtual screen in the VST screen. The electronic device 10 may increase, in a stepwise manner, the depth of the virtual screen in the VST screen. In order to increase the depth of the virtual screen, the electronic device 10 may move the virtual screen away from the wearer 20 on the entire screen representing the 3D space. In this regard, although the wearer 20 is stationary, the depth of the virtual screen may be adjusted so that it appears that a scene is moving away from the user.

If the visual effect is applied to the VST screen in a stepwise manner, the electronic device 10 may output a VST screen having a visual effect of displaying a preset background screen, over time, instead of the real screen. For example, if a proportion of the virtual screen occupied in the VST screen is decreased, the visual stimulation to the wearer 20 may be reduced.

The electronic device 10 may provide a visual effect of differentially adjusting blue light for each object included in the VST screen based on attributes of the objects. The blue light may stimulate the brain to effect the circadian rhythm and disturb (e.g., disrupt) the sleep onset. The electronic device 10 may apply a visual effect of increasing, in a stepwise manner, the blue light, differentially adjusted for each of the objects over time to the VST screen. The attributes of the objects may include a first indicator indicating one of the real screen or the virtual screen including the corresponding object. The attributes of the objects may include a second indicator indicating whether the corresponding object emits light. The attributes of the objects may include a third indicator indicating the light source type of the corresponding object. The attributes of the objects may include at least one of the first indicator indicating one of the real screen or the virtual screen including the corresponding object, the second indicator indicating whether the corresponding object emits light, or the third indicator indicating the light source type of the corresponding object. The attributes of the objects may include the first indicator indicating one of the real screen or the virtual screen including the corresponding object, the second indicator indicating whether the corresponding object emits light, and the third indicator indicating the light source type of the corresponding object.

The electronic device 10 may provide a visual effect of differentially adjusting illuminance of each of the objects included in the VST screen considering the attributes of the objects. The illuminance may stimulate the brain to effect the circadian rhythm and disturb (e.g. disrupt) the sleep onset. The electronic device 10 may apply a visual effect of increasing, in a stepwise manner, illuminance differentially adjusted for each of the objects over time to the VST screen. The attributes of the objects may include a first indicator indicating one of the real screen or the virtual screen including the corresponding object. The attributes of the objects may include a second indicator indicating whether the corresponding object emits light. The attributes of the objects may include a third indicator indicating the light source type of the corresponding object. The attributes of the objects may include at least one of the first indicator indicating one of the real screen or the virtual screen including the corresponding object, the second indicator indicating whether the corresponding object emits light, or the third indicator indicating the light source type of the corresponding object. The attributes of the objects may include the first indicator indicating one of the real screen or the virtual screen including the corresponding object, the second indicator indicating whether the corresponding object emits light, and the third indicator indicating the light source type of the corresponding object.

As described above, if the electronic device 10 adjusts, in a stepwise manner, blue light and/or illuminance for each object on the VST screen over time (e.g., the blue light and/or illuminance is incrementally adjusted for a predetermined period of time), the degree of obstruction of the sleep onset to the wearer 20 may be sequentially reduced, but the visual sense of reality may be maintained.

If the electronic device 10 performs the sleep onset preparation function of reducing, in a stepwise manner, the external stimulation based on the passage of time during the sleep onset preparation time interval, the electronic device 10 may reduce, in a stepwise manner, the volume of sound output due to the content service. The electronic device 10 may perform an operation for reducing, in a stepwise manner, external stimulation based on the passage of time and may vary the sound source output in a stepwise manner. For example, the electronic device 10 may operate to output a sound (e.g., a sleep leading sound) helpful for the sleep onset in proportion to the passage of time.

Figure 2:
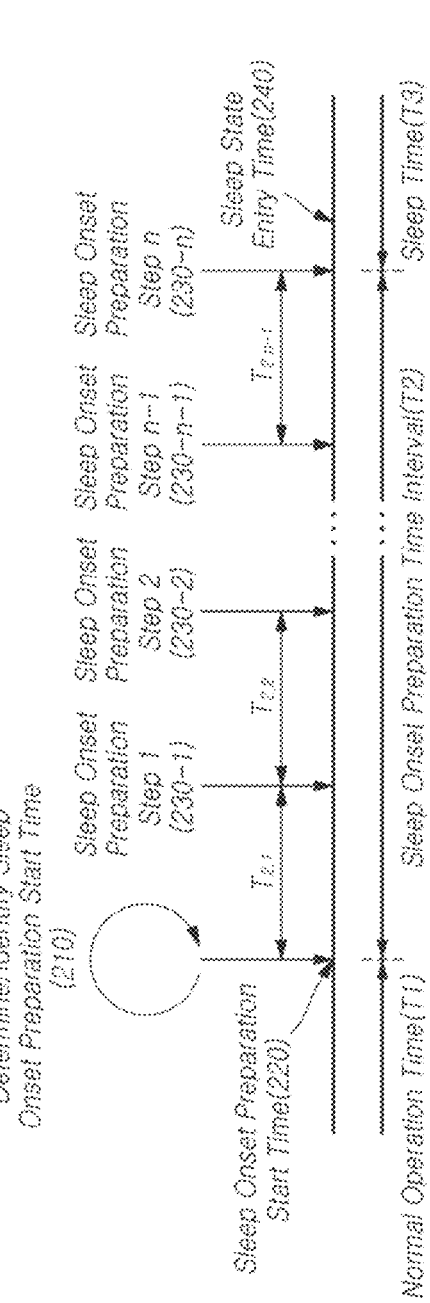
FIG. 2 illustrate a time flowchart illustrating an example time line for inducing a user sleep onset in an electronic device according to one or more embodiments.
Figure 3:
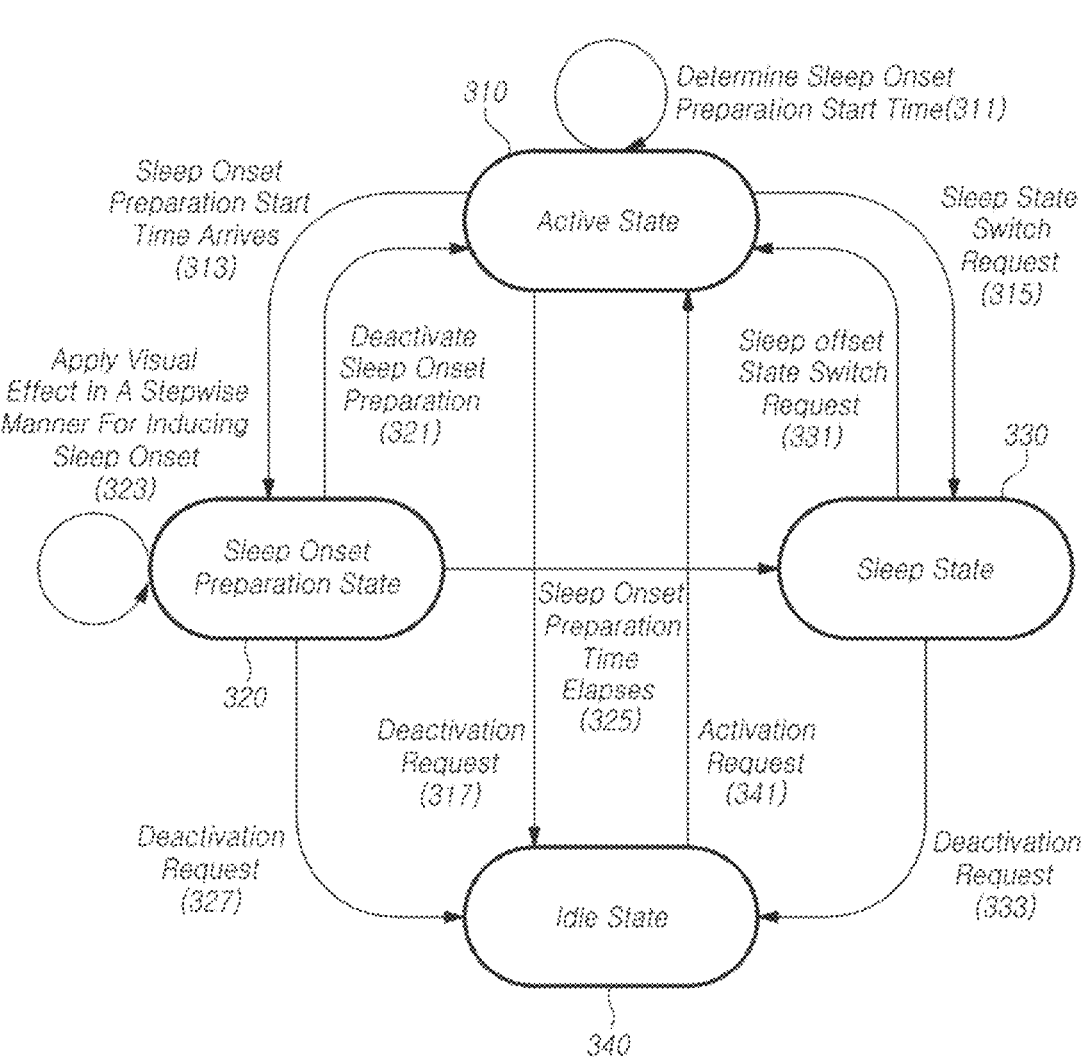
FIG. 3 is a view illustrating an example transition state of an electronic device according to one or more embodiments.

FIG. 2 illustrates a time flowchart illustrating an example timeline for inducing a user to sleep onset in an electronic device (e.g., the HMD device 10 of FIG. 1) according to various embodiments. FIG. 3 is a view illustrating an example state transition of an electronic device according to one or more embodiments.

Referring to FIG. 2 or FIG. 3, the wearer 20 may fall asleep while wearing the electronic device 10. The electronic device 10 may monitor the sleep onset situation (e.g., status or process) of the wearer 20. The electronic device 10 may perform an operation for leading (e.g., inducing) the wearer 20 to the sleep onset based on the sleep onset situation (e.g., status or process) of the wearer 20. The operation for leading the wearer 20 to the sleep onset may be divided into a normal operation step (e.g., the active state 310 of FIG. 3), a sleep onset preparation step (e.g., the sleep onset preparation state 320 of FIG. 3), or a sleep step (e.g., the sleep state 330 of FIG. 3). Further, an idle step (e.g., the idle state 340 of FIG. 3) may be further included.

The normal operation step 310 may be a step in which the electronic device 10 provides visual information and/or auditory information according to a content service to the wearer 20. For example, the visual information may be provided to the wearer 20 by outputting the visual information about a screen in an entire area or a partial area of the display. The auditory information may be provided to the wearer 20 through, for example, an internal speaker or an external speaker. The normal operation step 310 may be an operation state that may be performed by the electronic device 10 before the sleep onset preparation start time arrives. The normal operation step 310 may be an operation state that may be performed by the electronic device 10 when the wearer 20 is awake.

The normal operation step 310 may be a step in which a normal operation is performed by the electronic device 10 during a normal operation time T1. The normal operation time T1 may be a time period corresponding to the normal operation step in which the wearer 20 is awake so that the sympathetic nerve a greater effect compared to the parasympathetic nerve (e.g., nerve responsible for relaxing user). The main actions of the sympathetic nerve may include enlarging the pupil, inhibiting saliva secretion, quickening the heartbeat, enlarging the bronchi, inhibiting the distribution of digestive juices, inhibiting secretion of adrenaline or noradrenaline, or bladder contraction. The main actions of the parasympathetic nerve may include narrowing the pupil, stimulating saliva secretion, slowing the heartbeat, narrowing the bronchi, stimulating the distribution of digestive juices, stimulating the secretion of bile, or contracting the bladder. In one or more examples, the main actions of the sympathetic nerve may be activated while the person is awake. In one or more examples, the main actions of the parasympathetic nerve may be activated while the person is asleep.

The normal operation time T1 may be defined by the time period from when the user 10 wears the electronic device 10 or starts a predetermined content service after wearing the electronic device 10 to the sleep onset preparation start time 220. The normal operation time T1 may be defined by the time period from when the wearer 10 wakes up (e.g., referred to as a "sleep offset time") to the time 220 when the wearer 10 starts to prepare for sleep onset.

In the normal operation step 310, the electronic device 10 may determine and/or identify the sleep onset preparation start time 220 (operation 311). As described above with reference to FIG. 1, the electronic device 10 may obtain the sleep onset preparation start time based on preset time information (e.g., a sleep onset target time or a wake-up target time) or fatigue level of the wearer 20.

In the normal operation step 310, the electronic device 10 may monitor and determine whether the sleep onset preparation start time has arrived. When the time reaches the sleep onset preparation start time 220, the electronic device 10 may switch from the normal operation step 310 to the sleep onset preparation step 320 (operation 313). If a request for switching the sleep state occurs in the normal operation step 310, the electronic device 10 may switch the state from the normal operation step 310 to the sleep step 330 (operation 315). The sleep state switching request may be generated if the wearer 20 instructs to switch to the sleep step 310 for the purpose of reaching a sleep state by self.

The sleep onset preparation step 320 may be a step in which the sleep onset preparation start time 220 has arrived (e.g., operation 313), so that the electronic device 10 lowers (or reduces) the sympathetic nerve activation of the wearer 20 and reduces, in a stepwise manner, the external stimulation based on the passage of time (e.g., N seconds, where N is a positive integer) (operations 230-1 to 230-n or operation 323). The electronic device 10 may switch from the normal operation step 310 to the sleep onset preparation step 320 in response to the arrival of the sleep onset preparation start time (operation 313). The electronic device 10 may switch from the sleep onset preparation step 320 to the normal operation step 310 in response to a sleep onset preparation deactivation request (operation 321). The deactivation request may occur, for example, because the electronic device 10 is not selected as executing the sleep onset preparation mode based on the interaction with the wearer 20.

The sleep onset preparation step 320 may be a step in which an operation for leading (or inducing) to sleep onset of the wearer 20 is performed by the electronic device 10 during the sleep onset preparation time interval T2. The sleep onset preparation time interval T2 may be a time period in which the sleep onset preparation step for preparing to switch from the normal operation time T1, in which the sympathetic nerve has a greater effect, to the sleep time T3, in which the parasympathetic nerve has a greater effect, is performed. The sleep onset preparation time interval T2 may be defined by a time period from the sleep onset preparation start time 220 to a sleep state entry time 240 (e.g., referred to as a "sleep time").

The electronic device 10 may reduce, in a stepwise manner, the external stimulation to be applied to the wearer 20 during the sleep onset preparation time interval T2 at the sleep onset preparation start time (e.g., operations 230-1 to 230-n or operation 323). The electronic device 10 may output, in a stepwise manner, a sleep onset preparation screen in which the visual stimulation to be applied to the wearer 20 is reduced, in a stepwise manner, based on the passage of time. The sleep onset preparation screen may be a VST screen according to the partial immersion mode. The VST screen may reduce the visual immersion level of the wearer 20 to reduce the activation of the sympathetic nerve. The visual immersion level may be proportional to the size of the screen output through the display. The immersion level may increase, for example, as the size of the screen increases and may decrease as the size of the screen decreases.

The VST screen may display a virtual screen with the real screen (e.g., real place or space) as the background. The real screen may display an image of a real space captured by the electronic device 10. The virtual screen may provide a content service. The electronic device 10 may output the VST screen so that the visual sense of reality to be provided by the content service is maintained considering the object included in the virtual screen or the attribute of the object included in the real screen.

The electronic device 10 may reduce, in a stepwise manner, the proportion of the virtual screen occupied in the VST screen over time (operations 230-1 to 230-n). The end time of each of the n (where n is a positive integer) sleep onset preparation steps (e.g., sleep onset preparation step 1 to sleep onset preparation step n) illustrated in FIG. 2 may correspond to the start time of the next the sleep onset preparation step. For example, the operation according to sleep onset preparation step 1 may be performed during the first time period $T_{2,\,1}$ from the time 220 when the sleep onset preparation start time arrives to the end time 230-1 of sleep onset preparation step 1. For example, the operation according to sleep onset preparation step n may be performed during the n−1th time period $T_{2,\,n-1}$ from the start time 230n−1 of sleep onset preparation step n−1 to the end time 230-n of sleep onset preparation step n. In one or more examples, the sleep onset preparation time interval T2 may be defined by an interval containing n steps, where the steps may be equally divided. For example, if the sleep onset preparation time interval is 10 minutes and contains 10 equally divided steps, a visual effect being applied in a stepwise manner may be applied in one (1) minute intervals, with step 1 including the sleep onset preparation start time. In one or more examples, the steps may not be applied at equal intervals in during the interval corresponding to the sleep onset preparation time interval.

The electronic device 10 may switch from the immersion mode to the partial immersion mode at the sleep onset preparation start time 220. The immersion mode may be a display mode for outputting a virtual screen through the entire display area of the display. The partial immersion mode may be a display mode for outputting a VST screen through the entire display area of the display. The electronic device 10 may output an initial VST screen through the display during the first time period $T_{2,\,1}$ in which the operation according to sleep onset preparation step 1 is to be performed.

The electronic device 10 may output, through the display, a VST screen in which the size of the virtual screen is reduced, in a stepwise manner, during the second time period $T_{2,\,2}$ to the n−2 time period $T_{2,\,n-2}$ in which the operations according to sleep onset preparation step 2 to sleep onset preparation step n−1 are to be performed. The electronic device 10 may increase, in a stepwise manner, the depth of the virtual screen in the VST screen. This operation may provide an effect of moving the virtual screen away from the wearer 20 in a three-dimensional (3D) space. The electronic device 10 may reduce, in a stepwise manner, the proportion of the virtual screen occupied in the VST screen. This may provide an effect of reducing the size of the virtual screen in a two-dimensional (2D) space.

The electronic device 10 may apply a screen effect (e.g., blue light or illuminance), which may be differentiated for each object included in the VST screen during the n−1th time period $T_{2,\,n-1}$ in which the operation according to sleep onset preparation step n is to be performed. As an example, the electronic device 10 may differentially adjust blue light for each of the objects included in the VST screen considering the attributes of the objects. The blue light may stimulate the brain to effect the circadian rhythm and disturb (e.g., disrupt) the sleep onset. The electronic device 10 may increase, in a stepwise manner, blue light that is differentially adjusted for each of the objects over time. The electronic device 10 may differentially adjust the illuminance of each of the objects included in the VST screen considering the attributes of the objects. The illuminance may stimulate the brain to effect the circadian rhythm and disturb (e.g., disrupt) the sleep onset. The electronic device 10 may increase, in a stepwise manner, the illuminance differentially adjusted for each of the objects over time.

As described above, if the electronic device 10 adjusts, in a stepwise manner, blue light and/or illuminance for each object on the VST screen over time, the degree of obstruction of the sleep onset to the wearer 20 may be sequentially decreased, but the visual sense of reality may be maintained.

In one or more examples, if the electronic device 10 performs (e.g., executes) the sleep onset preparation function of reducing, in a stepwise manner, the external stimulation based on the passage of time during the sleep onset preparation time interval, the electronic device 10 may reduce, in a stepwise manner, the volume of sound output due to the content service. The electronic device 10 may perform a method for reducing, in a stepwise manner, external stimulation based on the passage of time by varying the sound source output in a stepwise manner. For example, the electronic device 10 may operate to output a sound (e.g., a sleep leading sound) helpful for the sleep onset in proportion to the passage of time.

In the sleep onset preparation step 320, the electronic device 10 may monitor and determine whether the sleep onset preparation time interval has elapsed. If the sleep onset preparation time interval has elapsed, the electronic device 10 may switch from the sleep onset preparation step 320 to the sleep step 330 (operation 325). The sleep step may correspond to the step after the brain switches to the sleep state.

The sleep time T3 during which the electronic device 10 operates in the sleep step 330 may be a time period (e.g., a sleep time period) during which the parasympathetic nerve has a greater effect compared to the sympathetic nerve and the wearer 20 is asleep. The sleep time T3 may be defined by a time period from the sleep entry time 240 to when the wearer 20 wakes up. For example, if a sleep offset state switch request is generated in the sleep step 330, the electronic device 10 may switch the state from the sleep step 330 to the normal operation step 310 (operation 331). The sleep offset switch request may be generated when the wearer 20 wakes up by him/herself (e.g., without external assistance or help) and instructs to resume the content service.

The electronic device 10 may monitor whether a deactivation request is generated in each of the normal operation step 310, the sleep onset preparation step 320, or the sleep step 330. The deactivation request may be generated by the wearer 20 instructing to terminate the content service by him/herself. If the deactivation request is generated, the electronic device 10 may switch to the idle state 340 (operations 317, 327, and 333).

If an activation request is generated in the idle state 340, the electronic device 10 may switch from the idle state 340 to the active state 310 (operation 341). The activation request may be generated by the wearer 20 instructing to resume the content service that has been terminated by him/herself.

Figure 4:
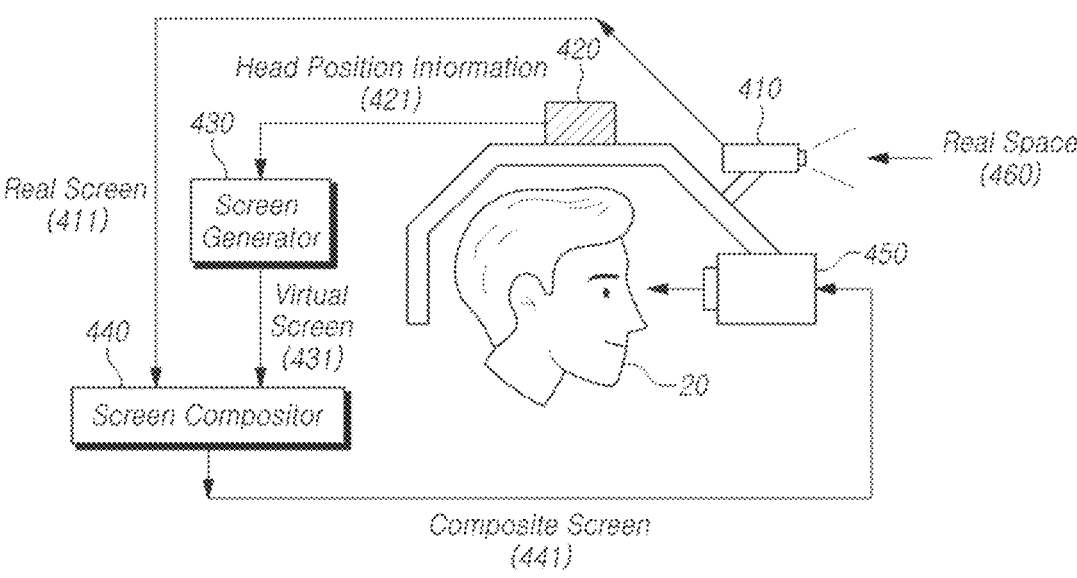
FIG. 4 is a view illustrating an example of an operation for providing a VST screen in an electronic device according to one or more embodiments.

FIG. 4 is a view illustrating an example of an operation for providing a VST screen in an electronic device (e.g., the HMD device 10 of FIG. 1) according to various embodiments.

Referring to FIG. 4, the electronic device 10 may include a camera 410, a head tracker 420, a screen generator 430, a screen compositor 440, or a monitor 450.

The camera 410 may be disposed to face forward while the user 20 is wearing the electronic device 10. The camera 410 may output an image 411 obtained by capturing a real space or place 460 (or "real screen"). The real space or real screen may be a space in which the user 20 is actually (e.g., physically) present.

The head tracker 420 may track the position of the moving head while the user 20 is wearing the electronic device 10. The head tracker 420 may output head position information (e.g., head locators) 421 according to the tracking.

The screen generator 430 may generate a virtual screen 431 for the user 20 taking into consideration the head position information provided from the head tracker 420 on the virtual screen according to the content service.

The screen compositor 440 may generate a composite screen (e.g., a VST screen) 441 by synthesizing (e.g., combining) the real screen 411 provided from the camera 410 and the virtual screen 431 provided from the screen generator 430. The composite screen 441 generated by the screen compositor 440 may be transferred to the monitor 450. In one or more examples, the composite screen 441 may display one or more objects corresponding to the real screen 411 as a background, while the virtual screen 431 containing one or more objects are overlaid on the real screen 411.

The monitor 450 may output the composite screen 441 transmitted from the screen compositor 440 as visual information. The user 20 may view the composite screen 441 output from the monitor 450.

FIGS. 5A, 5B, 5C, and 5D are views illustrating an example arrangement of hardware components in an electronic device (e.g., the HMD device 10 of FIG. 1) according to various embodiments.

Referring to FIGS. 5A to 5D, the electronic device 10 may include a front portion exposed to the outside or an inner side (e.g., surface) facing a wearer (e.g., the wearer 20 of FIG. 1). An external sensor unit (e.g., the external sensor unit 810 of FIG. 8) including left/right depth cameras 811a and 811b (e.g., the depth camera 811 of FIG. 8), left/right side cameras 813a and 813b (e.g., the side camera 813 of FIG. 8), left/right downward cameras 815a and 815b (e.g., the downward camera 815), or left/right infrared (IR) sensors 817a and 817b (e.g., the IR sensor 817 of FIG. 8) may be configured in the front portion of the electronic device 10 (see FIG. 5A). Positions at which the left/right depth cameras 811a and 811b, the left/right side cameras 813a and 813b, the left/right downward cameras 815a and 815b, or the left/right IR sensors 817a and 817b are disposed in the front portion are not necessarily fixed but may be determined at the design stage (e.g., during the design) of the electronic device 10. As understood by one of ordinary skill in the art, the positions of the components of the electronic device 10 may be arranged to optimize information collection and performance of the electronic device 10.

An eye recognition unit (e.g., the eye recognition unit 820 of FIG. 8) including an IR camera 821 (e.g., the IR camera 821 of FIG. 8) or an LED ring 823 (e.g., the LED ring 823 of FIG. 8) may be configured on the inner surface of the electronic device 10. A sound unit (e.g., the sound unit 840 of FIG. 8) including a microphone 841 (e.g., the microphone 841 of FIG. 8) or a speaker 843 (e.g., the speaker 843 of FIG. 8) may be configured on the inner side (e.g., surface) of the electronic device 10 (see FIG. 5B).

Figure 8:
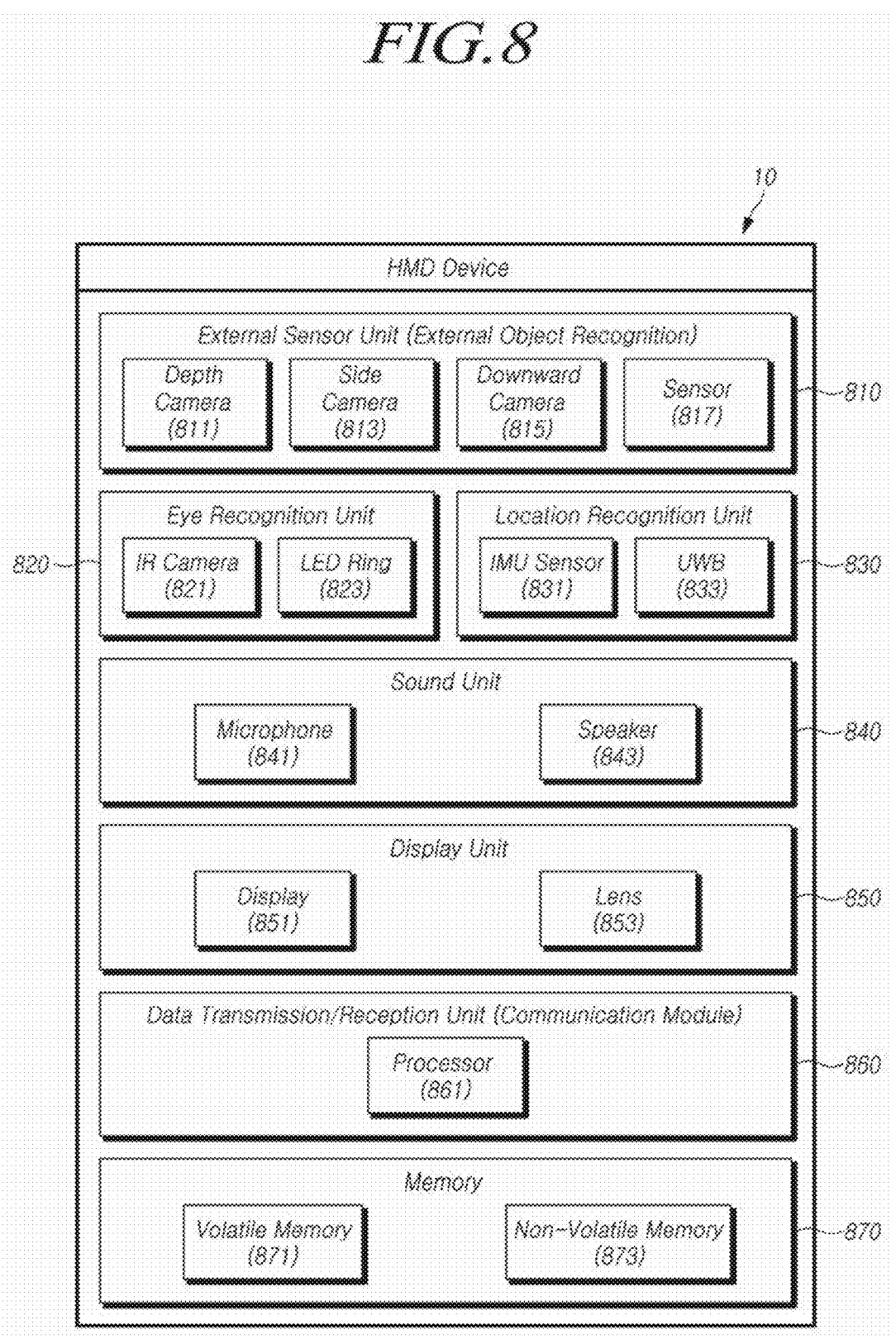
FIG. 8 is a block diagram illustrating an example configuration of an electronic device according to one or more embodiments.

The electronic device 10 may include at least one processor 861 (e.g., the processor 861 of FIG. 8). The electronic device 10 may include a location recognition unit (e.g., the location recognition unit 830 of FIG. 8) including an inertial measurement unit (IMU) sensor 831 (e.g., the IMU sensor 831 of FIG. 8) or an ultra-wideband (UWB) 833 (e.g., the UWB 833 of FIG. 8) (see FIG. 5C).

Figure 5A:
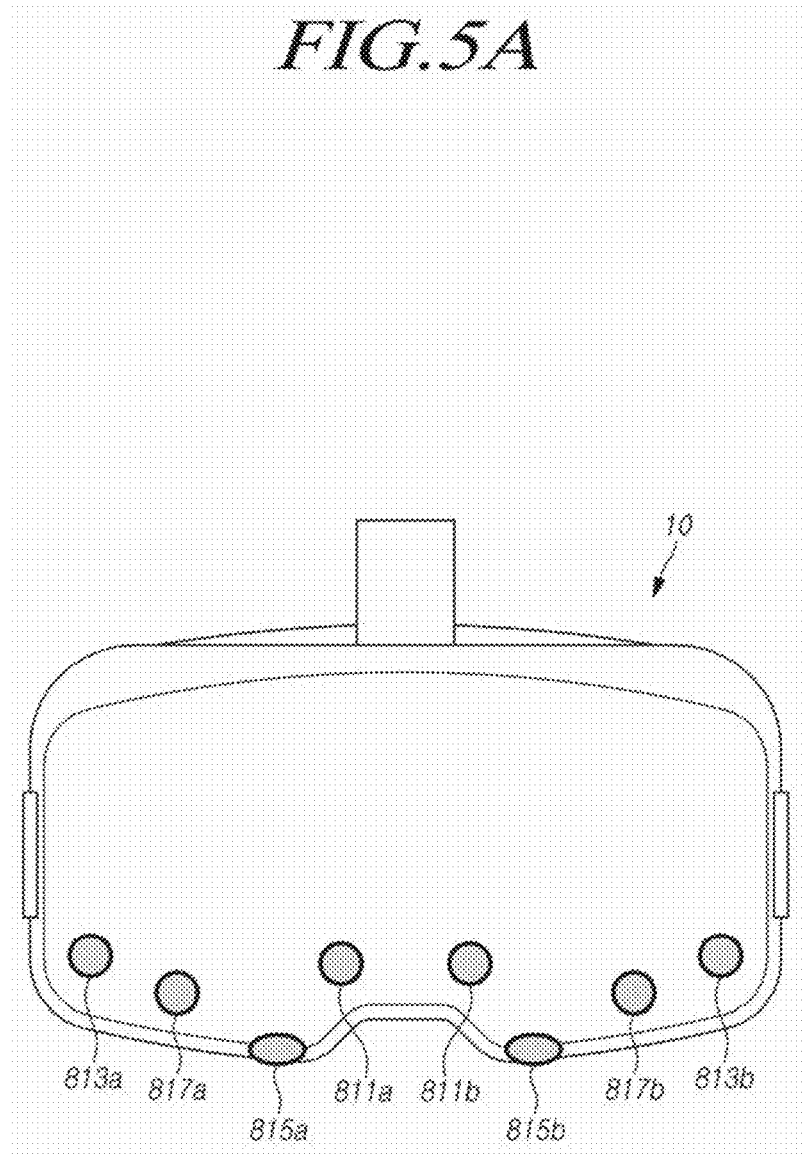
FIGS. 5A, 5B, 5C, and 5D are views illustrating an example arrangement of hardware components in an electronic device according to one or more embodiments.
Figure 5B:
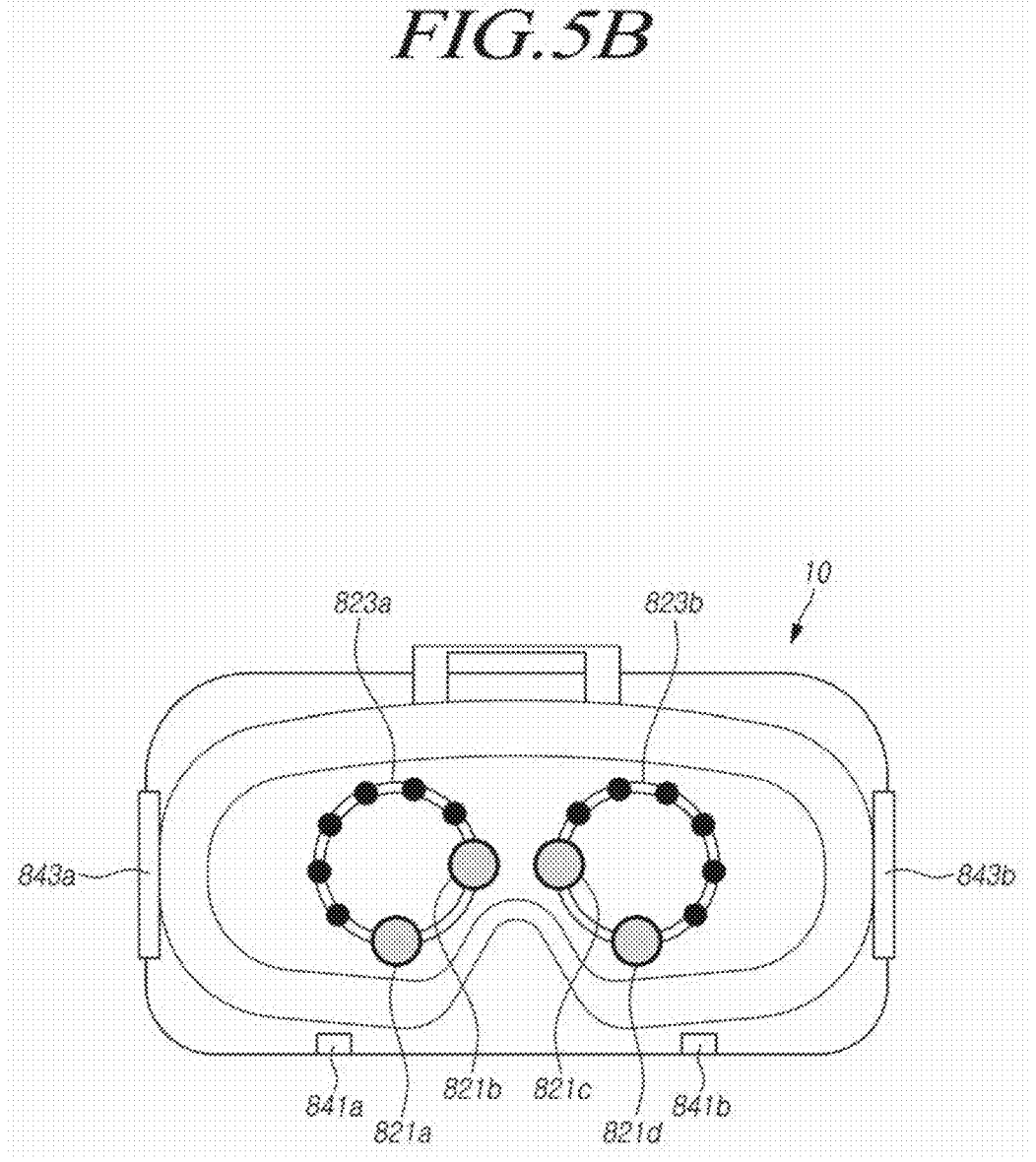
Figure 5C:
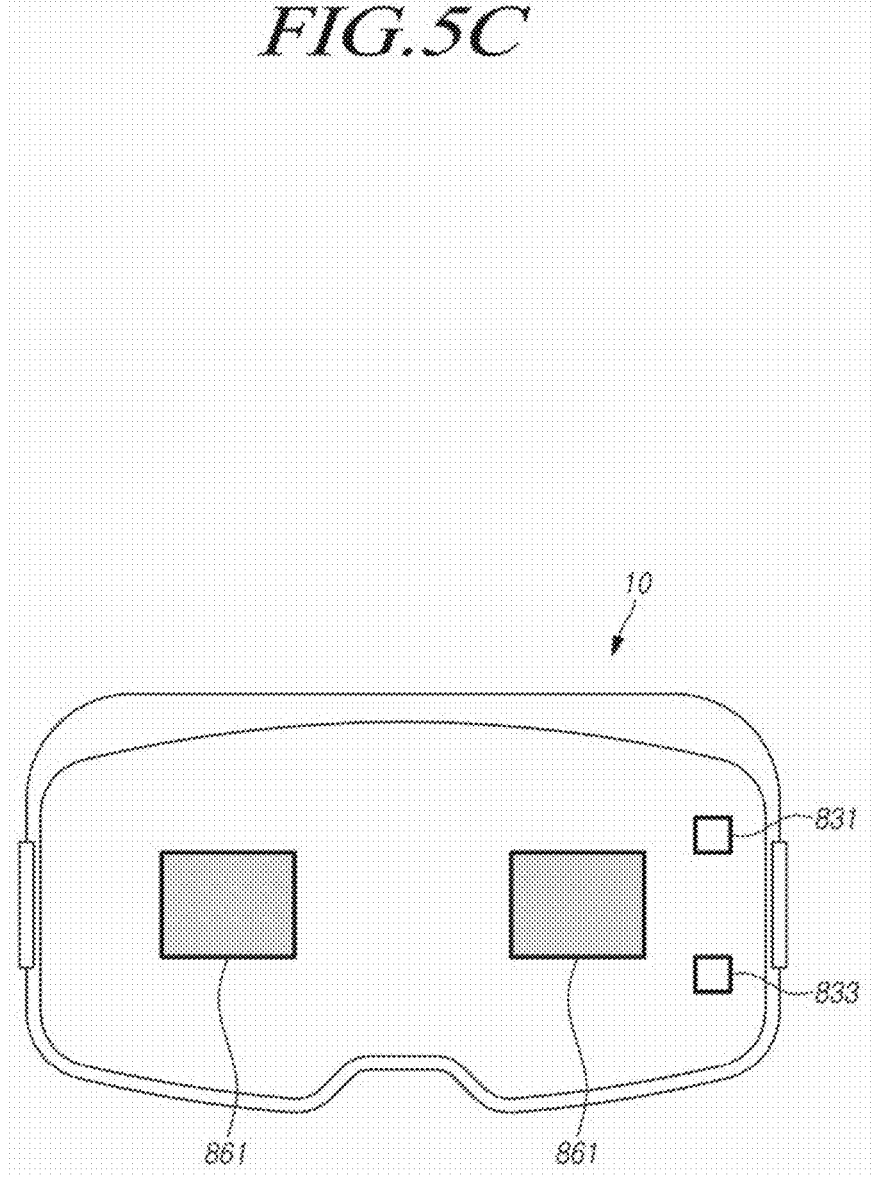
Figure 5D:
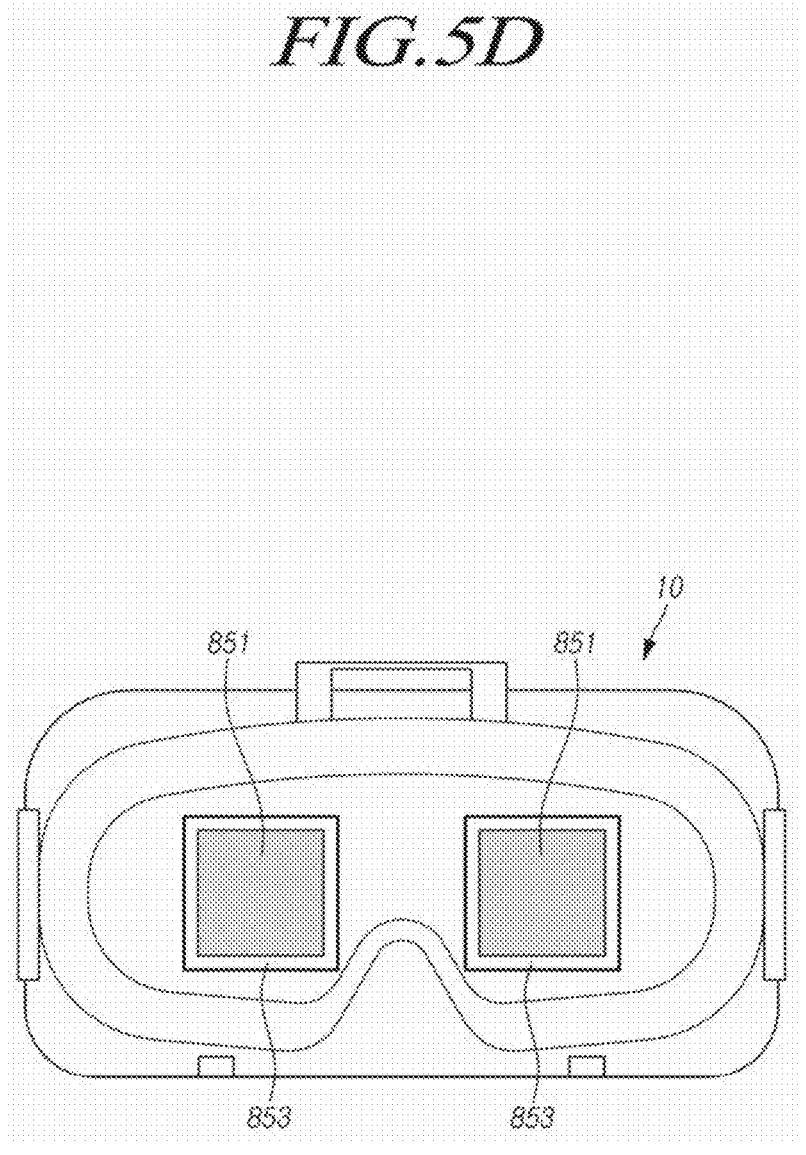

A display unit (e.g., the display unit 850 of FIG. 8) including a display 851 (e.g., the display 851 of FIG. 8) or a lens 853 (e.g., the lens 853 of FIG. 8) may be configured on the inner side (e.g., surface) of the electronic device 10 (see FIG. 5D). In one or more examples, the display 851 may be a single display having a width or length such that the display covers both eyes of the user. In one or more examples, the electronic device 10 may include an individual display 851 for each eye of the user.

Figure 6:
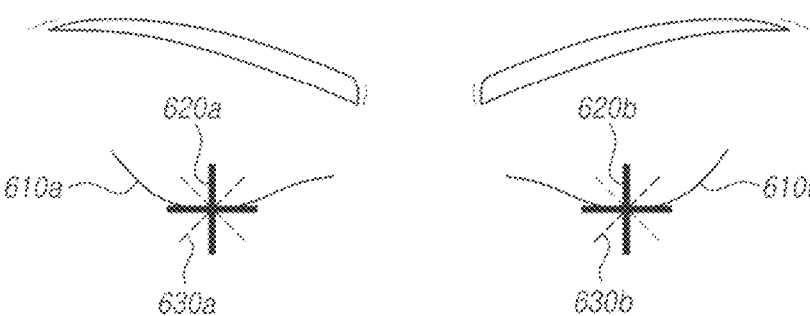
FIG. 6 is a view illustrating an example of predicting a fatigue level of a wearer in an electronic device according to one or more embodiments.

FIG. 6 is a view illustrating an example of predicting a fatigue level of a wearer (e.g., the wearer 20 of FIG. 1) in an electronic device (e.g., the HMD device 10 of FIG. 1) according to one or more embodiments.

Referring to FIG. 6, the electronic device 10 may include one or more sensor modules (e.g., IR camera modules) (e.g., the first to fourth IR cameras 821a, 821b, 821c, and 821d of FIG. 5B) disposed therein toward the face (e.g., facing the eyes) of the wearer 20. For example, at least one first IR camera (e.g., the third or fourth IR cameras 821c and 821d of FIG. 5B) may be disposed inside the electronic device 10 to face the right eye. The at least one first IR camera 821c or 821d may be an IR camera for the right eye. For example, at least one second IR camera (e.g., the first or second IR cameras 821a and 821b of FIG. 5B) may be disposed inside the electronic device 10 to face the left eye. The at least one first IR camera 821a or 821b may be an IR camera for the left eye.

The electronic device 10 may obtain an eye image (e.g., the right-eye image 610a and/or the left-eye image 610b) of the wearer 20 based on an image captured by the at least one first IR camera 821c or 821d and/or the at least one second IR camera 821a or 821b. For example, the electronic device 10 may obtain the right-eye image 610a of the wearer 20 based on the image captured by the at least one first IR camera 821c or 821d. For example, the electronic device 10 may obtain a left-eye image 610b of the wearer 20 based on the image captured by the at least one second IR camera 821a or 821b.

The electronic device 10 may obtain a first reference point 630a (hereinafter, referred to as a "right-eye reference point") from the right-eye image 610a. The electronic device 10 may obtain information or data related to whether the right-eye reference point 630a matches a first alignment point 620a (hereinafter, referred to as a "right-eye alignment point"). The electronic device 10 may obtain a second reference point 630b (hereinafter, referred to as a "left-eye reference point") from the left-eye image 610b. The electronic device 10 may obtain information or data related to whether the left-eye reference point 630b matches a second alignment point 620b (hereinafter, referred to as a "left-eye alignment point"). The electronic device 10 may determine whether the wearer 20 falls asleep based on whether the right-eye reference point 630a matches the right-eye alignment point 620a. The electronic device 10 may determine the fatigue level of the wearer 20 based on whether the left-eye reference point 630b matches the left-eye alignment point 620b. The electronic device 10 may obtain the eye closed duration, the number of blinks, the pupil diameter, or the eyeball surface temperature of the wearer 20, based on the sensing signal detected by one or more sensor modules (e.g., an IR camera module) (e.g., the first to fourth IR cameras 821a, 821b, 821c, and 821d of FIG. 5B).

The electronic device 10 may determine a fatigue level value indicating the fatigue level of the wearer 20 based on whether the right eye reference point 630a matches the right eye alignment point 620a and information obtained thereafter. Items of information for determining the fatigue level of the wearer 20 may include the eye closed duration (e.g., duration in which the eyes are closed), the number of blinks, the pupil diameter, the eyeball surface temperature, or the heart rate variability. The electronic device 10 may measure the eyes closed duration based on an image captured by a camera (e.g., the IR camera 821 of FIG. 8). The electronic device 10 may measure the number of blinks by image processing for recognizing the pupil in the image captured by the camera (e.g., the IR camera 821 of FIG. 8). In one or more examples, an ultrahigh speed camera may be used as a camera for measuring the number of blinks. The electronic device 10 may not collect information for measuring the number of blinks while interacting with the user. The electronic device 10 may remove reflected light due to IR illumination from the image captured by the IR camera (e.g., the IR camera 821 of FIG. 8) and measure the pupil diameter based on the distribution of black pixels in images of a candidate group where the reflected light is removed. The electronic device 10 may extract the eyeball position from the image captured by a thermal imaging camera and predict (e.g., determine or estimate) the temperature measured at the extracted eyeball position as the eyeball surface temperature. The electronic device 10 may obtain heart rate variability in real time based on information provided from a wearable device such as a smart watch.

Table 1 below shows an example of predicting the fatigue level of the wearer 20 based on the eye closed duration, the number of blinks, the pupil diameter, the eyeball surface temperature, or the heart rate variability of the wearer 20.

TABLE 1

| Data | Measurement | Evaluation results |
|---|---|---|
| Eyes closed duration | N1 (minutes) | 1 (warning) |
| Number of blinks | N2 (times) | 0 (normal) |
| Pupil diameter | N3 (mm) | 1 (warning) |
| Eyeball surface temperature | N4 (° C.) | 1 (warning) |
| Heart rate variability | N5 (times/min.) | 0 (normal) |

In Table 1, in one or more examples, evaluation results are defined assuming an example of a result of comparing the measured values (N1, N2, N3, N4, and N5) with reference thresholds (N_th1, N_th2, N_th3, N_th4, and N_th5), respectively. As the evaluation result, for example, if the measurement values (N1, N2, N3, N4, and N5) are greater than or equal to the reference thresholds (N_th1, N_th2, N_th3, N_th4, and N_th5), respectively, a value set to "1", which is an indicator indicating that fatigue level has increased, is assigned. As the evaluation result, for example, if the measured values (N1, N2, N3, N4, and N5) are less than or equal to the reference thresholds (N_th1, N_th2, N_th3, N_th4, and N_th5), respectively, value set to "0", which is an indicator indicating that fatigue level has not increased, is assigned. The electronic device 10 may determine that the fatigue level of the wearer 20 is high if it is determined that a predetermined number or more of data is abnormal. As an example, the electronic device 10 may advance the sleep onset start time by a predetermined time (e.g., N minutes, where N is a positive integer) from the average wear time for each day of the week of the wearer 20 whenever the measured value of the corresponding item increases by the threshold value compared to the duration of time worn. For example, in a situation where the sleep onset start time is 9:40 pm, if the measured value of the corresponding item increases by the threshold, the sleep onset start time may be adjusted to 9:30 pm by advancing the sleep onset start time by five (5) minutes.

Figure 7:
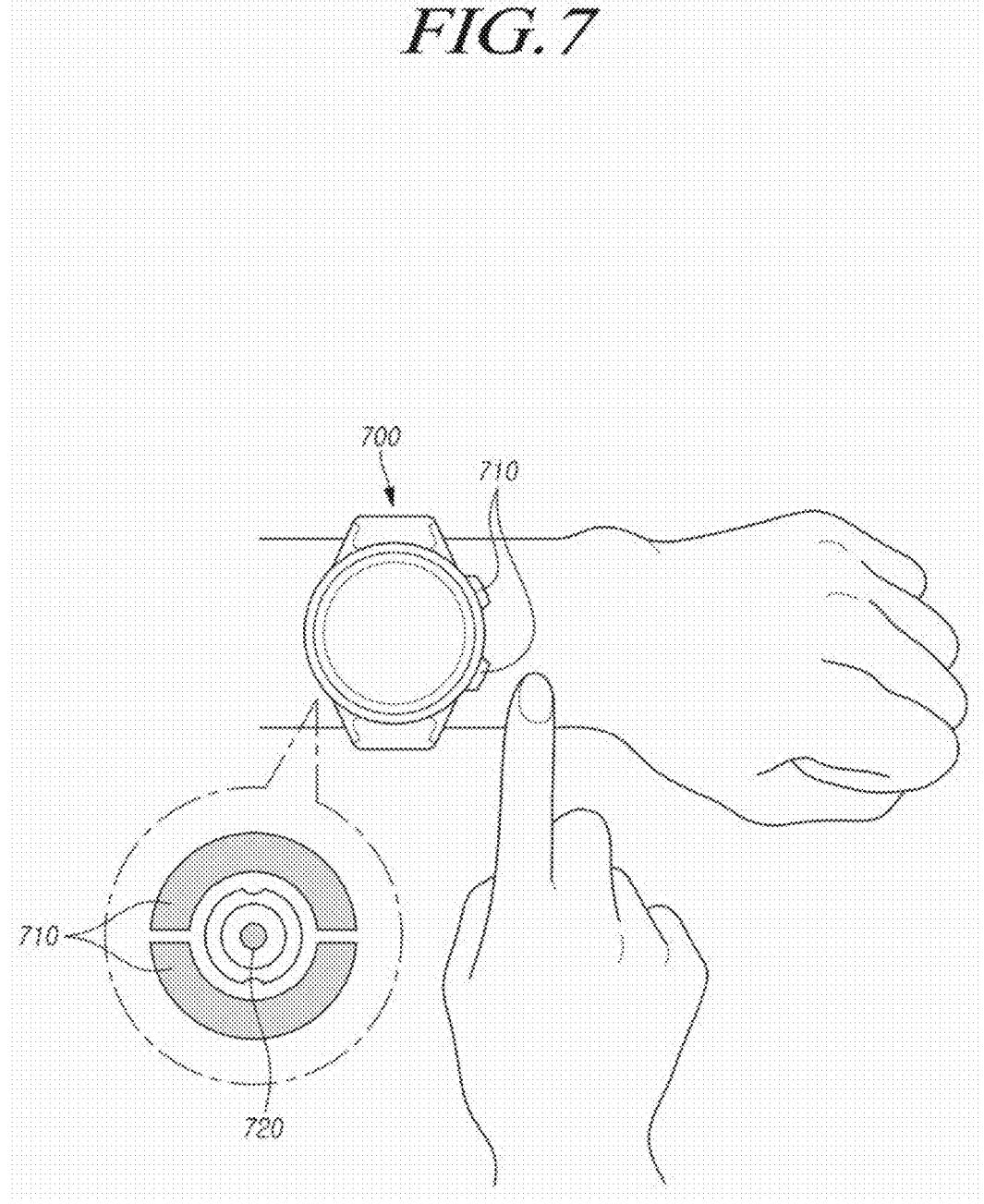
FIG. 7 is a view illustrating an example of wearing a wearable device to obtain a wearer's state information in an electronic device according to one or more embodiments.

FIG. 7 is a view illustrating an example of wearing a wearable device (e.g., the wearable device 40 of FIG. 1) to obtain a state information about a wearer (e.g., the wearer 20 of FIG. 1) in an electronic device (e.g., the HMD device 10 of FIG. 1) according to one or more embodiments.

Referring to FIG. 7, a wearable device 40 may be provided in various forms such as glasses, a ring, or a watch. The wearable device 40 may include, for example, a smart watch 700. The smart watch 700 may be worn on the user's wrist. The smart watch 700 may include various sensors. For example, the smart watch 700 may include an electric biometric sensor 710, an optical heart rate sensor 720, an acceleration sensor, and a gyro sensor.

The smart watch 700 may obtain user movement and/or biometric information (e.g., heart rate, respiration, pulse rate, and electrocardiogram) based on the sensing signal detected by at least one sensor. The smart watch 700 may determine whether the user 10 is asleep (e.g., in a sleep state) based on the obtained information (e.g., heart rate variability). The smart watch 700 may predict (e.g., determine or estimate) the fatigue level of the sleeping user 20 based on the obtained information. In one or more examples, the smart watch 700 may communicate information collected by the smart watch 700 to the electronic device 10.

FIG. 8 is a block diagram illustrating an example electronic device (e.g., the HMD device 10 of FIG. 1) according to one or more embodiments. Each of the units illustrated in FIG. 8 may be implemented by individual circuitry.

Referring to FIG. 8, the electronic device 10 may include an external sensor unit 810, an eye recognition unit 820, a location recognition unit 830, a sound unit 840, a display 850, a data transmission/reception unit (e.g., a communication module including a communication circuit) 860, or a memory 870. The external sensor unit 810 may include a depth camera 811, a side camera 813, a downward camera 815, or an IR sensor 817. The eye recognition unit 820 may include an IR camera 821 or an LED ring 823. The location recognition unit 830 may include an IMU sensor 831 or an UWB 833. The sound unit 840 may include a microphone 841 or a speaker 843. The display unit 850 may include a display 851 or a lens 853. The data transmission/reception unit (communication module) 860 may include at least one processor 861 (including, for example, a processing circuit). The memory 870 may include a user recognition module 871, a function control module 873, or a control right transfer module 875.

In one or more examples, the external sensor unit 810 may include at least one sensor. The external sensor unit 810 may output a sensing signal for recognizing (e.g., identifying) an external object. The external sensor unit 810 may detect an operation state (e.g., power or temperature) of the electronic device 10, an external environment state (e.g., a user state), or a movement of a hand or gaze for interaction with the user and may generate an electrical signal or a data value corresponding to the detected state. The external sensor unit 810 may further include a gesture sensor, a gyro sensor, an atmospheric pressure sensor, a magnetic sensor, an acceleration sensor, a grip sensor, a proximity sensor, a color sensor, a biometric sensor, a temperature sensor, a humidity sensor, or an illuminance sensor in addition to the depth camera 811, the side camera 813, the downward camera 815, or the IR sensor 817. The depth sensor 811 may output a sensing signal corresponding to a distance to an object. The side camera 813 may output an image obtained by photographing outward of the side surface of the electronic device 10. The downward camera 815 may output an image obtained by photographing downward of the electronic device 10. The IR sensor 817 may output a sensing signal capable of recognizing (e.g., identifying) whether an object is present.

In one or more examples, the eye recognition unit 820 may include an IR camera 821 or an LED ring 823 disposed toward the wearer 20. The IR camera 821 may output an image of the eyes of the wearer 20 and the surroundings of the eyes. The LED ring 823 may output a sensing signal for checking (e.g., monitoring) the eye alignment state of the wearer 20.

In one or more examples, the location recognition unit 830 may include an IMU sensor 831 or a UWB 833 for obtaining location information about the electronic device 10. The IMU sensor 831 may obtain location information about the electronic device 10 on three-dimensional coordinate axes. The IMU sensor 831 may output the obtained location information as a sensing signal. The UWB 833 may obtain location information about the electronic device 10 based on the UWB technology. The UWB 833 may output a sensing signal corresponding to the obtained location information.

In one or more examples, the external sensor unit 810, the eye recognition unit 820, or the location recognition unit 830 may constitute a sensor module. The sensor module may detect an operational state (e.g., power or temperature) of the electronic device 10 or an environmental state (e.g., the user's state such as a movement of the head or eyes) external to the electronic device 101, and then generate an electrical signal or data value corresponding to the detected state. The sensor module may include, for example, a gesture sensor, a gyro sensor, an atmospheric pressure sensor, a magnetic sensor, an accelerometer, a grip sensor, a proximity sensor, a color sensor, an IR sensor, a biometric sensor, a temperature sensor, a humidity sensor, or an illuminance sensor.

In one or more examples, the sound unit 840 may include a microphone 851 for converting external audio into an electrical signal or a speaker 843 for converting an electrical signal into an audible audio signal. The speaker 843 may generate a detachment leading sound under the control of the processor 861.

In one or more examples, the display unit 850 may visually provide visual information (e.g., real image information or virtual image information) to the outside (e.g., a wearer (e.g., the wearer 20 of FIG. 1)) of the electronic device 10. The display 850 may include, for example, a display 851, a lens 853, a hologram device, or a projector and a control circuit to control a corresponding device. The display unit 850 may include a touch sensor configured to detect a touch, or a pressure sensor configured to measure the intensity of a force generated by the touch. The display unit 850 may be controlled by electrical connection with the processor 861.

In one or more examples, the data transmission/reception unit 860 may include at least one processor 861. The processor 861 may execute software (e.g., a program) to control at least one other component (e.g., a hardware or software component) included in the electronic device 10 and may perform various data processing or computations. As at least part of the various data processing or computations, the processor 861 may store a command or data received from another component (e.g., the external sensor unit 810, the eye recognition unit 820, the location recognition unit 830, or the sound unit 840) in volatile memory 871, process the command or the data stored in the volatile memory 871, and store resulting data in non-volatile memory 873. As at least part of the various data processing or computations, the processor 861 may process a command or data received from another component (e.g., the external sensor unit 810, the eye recognition unit 820, the location recognition unit 830, or the sound unit 840) and output the result data through the display unit 850.

In one or more examples, the processor 120 may include a main processor (e.g., a central processing unit or an application processor) or an auxiliary processor (e.g., a graphics processing unit, a neural processing unit, an image signal processor, a sensor hub processor, or a communication processor (e.g., a communication module)) that is operable independently from or in conjunction with the main processor. For example, if the electronic device 10 includes the main processor and the auxiliary processor, the auxiliary processor may be configured to use lower power than the main processor or to be specified for a designated function. The auxiliary processor may be implemented separately from, or as part of, the main processor.

In one or more examples, the data transmission/reception unit 860 may include a communication module. The communication module may support establishing a direct (e.g., wired) communication channel or a wireless communication channel with another device (e.g., the smartphone 30 or wearable device 40 of FIG. 1) and performing communication via the established communication channel. The communication module may include one or more communication processors that operate independently of the processor 861 and support direct (e.g., wired) communication or wireless communication. The communication module may include, for example, a wireless communication module (e.g., a cellular communication module, a short-range wireless communication module, or a global navigation satellite system communication module) or a wired communication module (e.g., a local area network (LAN) communication module or a power line communication module). A corresponding one of these communication modules may communicate with the external device via a network (e.g., a short-range communication network, such as Bluetooth™, wireless-fidelity (Wi-Fi) direct, or IR data association (IrDA) or a long-range communication network, such as a legacy cellular network, a 5G network, a next-generation communication network, the Internet, or a computer network (e.g., LAN or wide area network). These various types of communication modules may be implemented as a single component (e.g., a single chip) or may be implemented as multi components (e.g., multi chips) separate from each other.

In one or more examples, the memory 870 may store various data used by at least one component (e.g., the external sensor unit 810, the eye recognition unit 820, the location recognition unit 830, or the processor 861) of the electronic device 10. The various data may include, for example, software (e.g., the program) and input data or output data for a command related thereto. The memory 870 may include the volatile memory 871 or the non-volatile memory 873.

In one or more examples, the processor 861 may determine and/or obtain the sleep onset preparation start time of the wearer 20. The sleep onset preparation start time indicates a time when the sleep onset preparation operation for reducing, in a stepwise manner, the external stimulation is started to lead (e.g., induce) to the sleep onset of the wearer 20. The external stimulation may be stimulation that may affect the wearer 20 as the electronic device 10 provides a content service. The external stimulation may be an input of information through one or more senses included in the five (5) senses (e.g., visual, auditory, olfactory, taste, and tactile senses) that the wearer 20 may feel. Visual stimulation and/or auditory stimulation may be provided, for example, as the stimulation that the wearer 20 may receive from the operation of the electronic device 10. The visual stimulation may be stimulation (e.g., glare) applied to the eyes of the wearer 20 by a screen output through the display 851. The visual stimulation may be reduced, in a stepwise manner, by adjusting at least one requirement for screen display, such as the brightness (e.g., illuminance), size or color of the display area.

In one or more examples, the processor 861 may obtain the sleep onset preparation start time based on a sleep onset target time or a wake-up target time of the wearer 20. The sleep onset target time may be a target time set by the wearer 20 in another electronic device (e.g., a smartphone 30 or smart watch 40) for sleep onset. The sleep onset target time may be set for a sleep onset alarm. The wake-up target time may be a target time set by the wearer 20 in the wearer's other electronic device (e.g., the smartphone 30 or the smart watch 40) for sleep offset. The wake-up target time may be set for a wake-up alarm. If the wearer 20 sets the target sleep time for the other electronic device (e.g., the smartphone 30 or the smart watch 40), the processor 861 may obtain the sleep onset preparation start time based on one of the sleep onset target time or the wake-up target time according to the target sleep time. The target sleep time may be a time period from the sleep onset target time to the wake-up target time. In one or more examples the electronic device (e.g., the smartphone 30 or the smart watch 40) and the electronic device 10 may coordinate with each other to determine the wake-up target time.

The processor 861 may obtain the sleep onset preparation start time by at least one of a set sleep onset target time or the sleep onset target time predicted based on the wake-up target time and the sleep onset preparation time interval. The sleep onset preparation time interval may be the entire time for the electronic device 10 to apply the visual effect in a stepwise manner. For example, if the sleep onset target time is 8 p.m. and the sleep onset preparation time interval is 20 minutes, the processor 861 may determine or obtain 7:40 p.m. as the sleep onset preparation start time based on the sleep onset preparation time interval of 20 minutes with respect to 8 p.m. as the sleep onset target time. For example, if the target sleep time is 8 hours, the wake-up target time is 6 a.m., and the sleep onset preparation time interval is 20 minutes, the processor 861 may determine or obtain 9:40 p.m. as the sleep onset preparation start time based on the sleep onset preparation time interval of 20 minutes with respect to 10 p.m., which is 8 hours before 6 a.m. If both the sleep onset target time and the wake-up target time are provided, the processor 861 may obtain (or determine) the sleep onset preparation start time by assigning priority to sleep onset target time.

In one or more examples, the processor 861 may obtain (or determine) the sleep preparation start time based on sleep data recorded for the wearer 20. The processor 861 may collect, for example, sleep data of the wearer 20 from a wearable device 40 worn by the wearer 20. For example, if it is analyzed (or determined) that the predicted sleep onset time of the wearer 20 is 10 p.m. based on the sleep data, the processor 861 may determine or obtain 9:40 p.m. as the sleep onset preparation start time based on the sleep onset preparation time interval of 20 minutes with respect to 10 p.m as the sleep onset time. For example, if the predicted sleep time of the wearer 20 is 8 hours and the predicted wake-up time is 6 a.m. by analyzing the sleep data, the processor 861 may determine or obtain 9:40 p.m. as the sleep onset preparation start time based on the sleep onset preparation time interval of 20 minutes, with respect to 10 p.m., which is 8 hours before 6 a.m.

In one or more examples, the processor 861 may determine that sleep onset preparation start time has arrived (e.g., has started) in response to the measurement of the fatigue level substantially satisfying a predetermined threshold level. For example, if the fatigue level obtained by the fatigue measurement reaches the predetermined threshold level, the processor 861 may determine that sleep onset start time has arrived (e.g., has started). In one or more examples, the processor 861 may measure the fatigue level of the wearer 20. The processor 861 may periodically or aperiodically measure the fatigue level of the wearer 20. In order to periodically measure the fatigue level, the processor 861 may preset a period for measuring the fatigue level. In order to aperiodically measure the fatigue level, the processor 861 may monitor the occurrence of an aperiodic event. The aperiodic event may be, for example, a movement in which the wearer 20 suddenly moves his head down and up. This may be detected by a sensing signal by at least one sensor.

In one or more examples, to measure the fatigue level, the processor 861 may measure the eye closed duration (e.g., duration in which the eyes are closed) of the wearer 20, the number of blinks of the wearer 20, the pupil diameter of the wearer 20, the eyeball surface temperature of the wearer 20, or the heart rate variability of the wearer 20. The processor 861 may measure at least one of the eyes closed duration, the number of blinks, the pupil diameter, or the eyeball surface temperature of the wearer 20 based on the signal detected by at least one sensor. The processor 861 may measure the heart rate variability of the wearer 20 based on information provided from the wearable device 40 worn by the wearer 20. The processor 861 may obtain a fatigue level value indicating the fatigue level based on at least one of the eyes closed duration, the number of blinks, the pupil diameter, the eyeball surface temperature, or the heart rate variability.

In one or more examples, the processor 861 may display, through the display 851, a message indicating whether to start the sleep onset preparation when the time reaches the sleep onset preparation start time. For example, the processor 861 may display the message as "It's time to get ready to sleep. Run sleep onset preparation mode?" In one or more examples, the processor 861 may display the guide message as "The fatigue level is high. Run fatigue level minimize mode?" The processor 861 may display a button (e.g., "Yes" button) for instructing to execute the sleep onset preparation mode and/or a button (e.g., "No" button) for instructing not to execute the sleep onset preparation mode through the display 851. The processor 861 may determine whether to execute the sleep onset preparation mode based on the interaction with the wearer 20.

In one or more examples, the processor 861 may, in a stepwise manner, reduce external stimulation that may affect the sleep quality or depth of the wearer 20 for a predetermined time (e.g., the sleep preparation time) at the sleep onset preparation start time. The method for reducing, in a stepwise manner, the external stimulation may be determined, for example, based on the type of content service being used by the wearer 20. The method for reducing, in a stepwise manner, the external stimulation may be determined based on, for example, the display mode being applied to the display 851. Accordingly, the processor 861 may provide a sleep environment (e.g., a virtual environment) in which it is easy for the wearer 20 to switch to sleep onset. For example, the processor 861 may output, through the display 851, a sleep onset preparation screen to which a visual effect capable of reducing, in a stepwise manner, visual stimulation based on the passage of time is applied. The processor 861 may apply a visual effect of switching the virtual screen that was being output through the entire display area of the display 851 to a VST screen to the sleep onset preparation screen. The immersion mode for outputting the virtual screen through the entire display area of the display 851 may be, for example, a VR mode. In the VR mode, the electronic device 10 may output the screen through the display 851 in a 360-shielded type. The VST screen may be output through the display 851 based on switching from the immersion mode to the partial immersion mode. The VST screen, according to the partial immersion mode, may decrease the visual immersion of the wearer 20 to reduce the activation of the sympathetic nerve. The visual immersion level may be proportional to the size of the screen output through the display 851. The immersion level may increase, for example, as the size of the screen increases, and may decrease as the size of the screen decreases.

In one or more examples, the processor 861 may reduce, in a stepwise manner, over time, the proportion of the virtual screen occupied in the VST screen. The processor 861 may reduce, in a stepwise manner, the size of the virtual screen in the VST screen. The processor 861 may increase, in a stepwise manner, the depth of the virtual screen in the VST screen. In order to increase the depth of the virtual screen, the processor 861 may move the virtual screen away from the wearer 20 on the entire screen representing the 3D space.

In one or more examples, the processor 861 may output a VST screen having a visual effect of displaying a preset background screen at each time point, over time, instead of the real screen. For example, if the proportion of the virtual screen occupied in the VST screen is reduced, the visual stimulation to the wearer 20 may be decreased.

In one or more examples, the processor 861 may provide a visual effect of differentially adjusting blue light for each of the objects included in the VST screen considering the attributes of the objects. The blue light may stimulate the brain to effect the circadian rhythm and disturb (e.g., disrupt) the sleep onset. The processor 861 may apply a visual effect of increasing, in a stepwise manner, blue light differentially adjusted for each of the objects, over time, to the VST screen.

In one or more examples, the processor 861 may provide a visual effect of differentially adjusting illuminance of each of the objects included in the VST screen while considering the attributes of the objects. The illuminance may stimulate the brain to effect the circadian rhythm and disturb the sleep onset. The processor 861 may apply a visual effect of increasing, in a stepwise manner, illuminance differentially adjusted for each of the objects over time to the VST screen.

As described above, if the processor 861 adjusts, in a stepwise manner, blue light and/or illuminance for each object on the VST screen over time, the degree of obstruction of the sleep onset to the wearer 20 may be sequentially decreased, but the visual sense of reality may be maintained.

In one or more examples, if the processor 861 performs the sleep onset preparation function of reducing, in a stepwise manner, the external stimulation based on the passage of time during the sleep onset preparation time interval, the electronic device 861 may reduce, in a stepwise manner, the volume of sound output due to the content service. The processor 861 is a method for reducing, in a stepwise manner, external stimulation based on the passage of time and may vary the sound source output in a stepwise manner. For example, the processor 861 may operate to output a sound (e.g., a sleep leading sound) to assist with the sleep onset in proportion to the passage of time.

Figure 9:
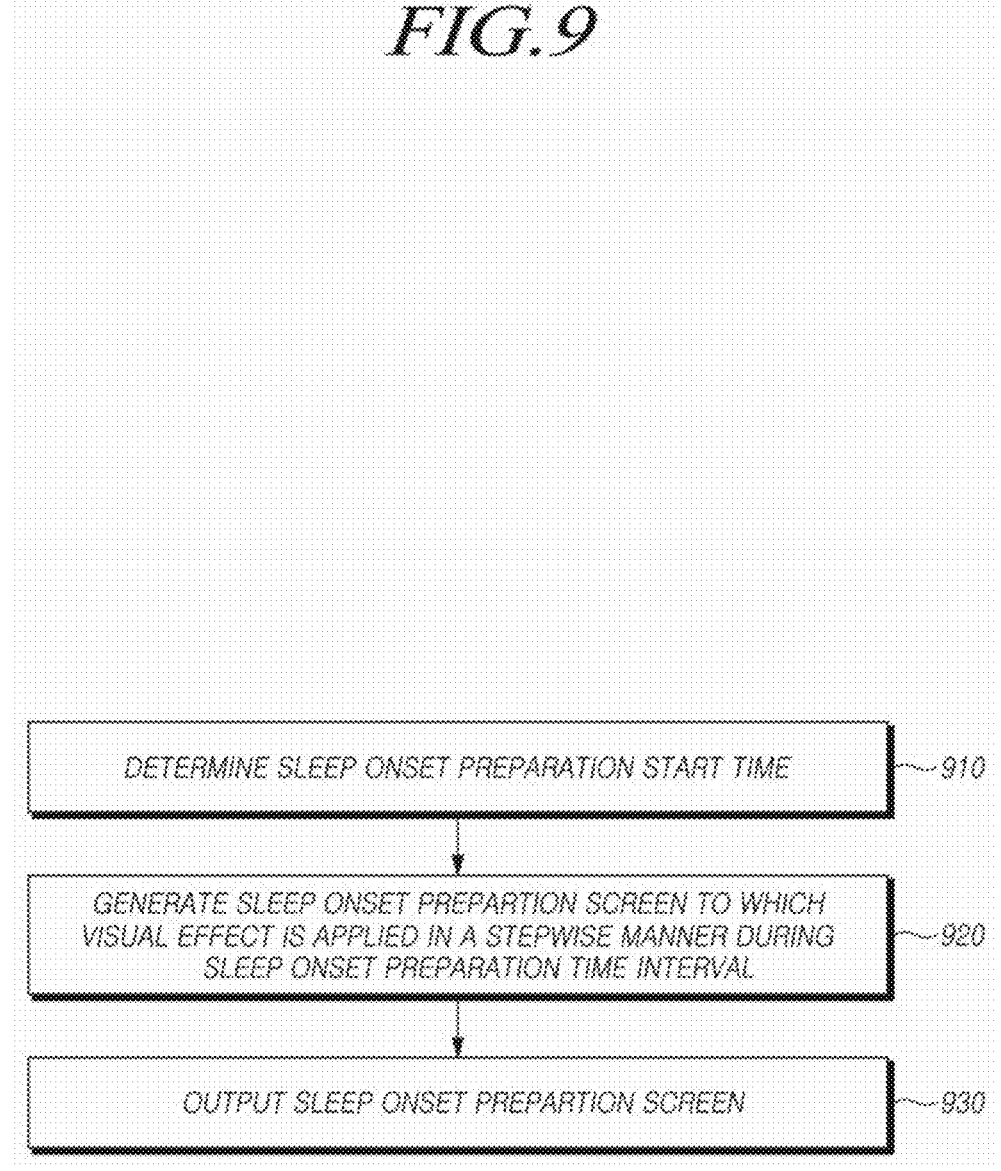
FIG. 9 is a control flowchart illustrating an example sleep onset inducement in an electronic device according to one or more embodiments.

FIG. 9 is a control flowchart illustrating an example sleep onset inducement in an electronic device (e.g., the HMD device 10 of FIG. 1) according to one or more embodiments.

Referring to FIG. 9, in operation 910, the electronic device 10 may determine and/or obtain a sleep onset preparation start time of a wearer (e.g., the wearer 20 of FIG. 1).

The electronic device 10 may obtain the sleep onset preparation start time based on at least one of the sleep onset target time or the wake-up target time of the wearer 20 and the sleep onset preparation time interval. For example, if the sleep onset target time is 8 p.m. and the sleep onset preparation time interval is 20 minutes, the electronic device 10 may determine 7:40 p.m. as the sleep onset preparation start time based on the sleep onset preparation time interval of 20 minutes with respect to 8 p.m as the sleep onset target time. For example, if the target sleep time is 8 hours, the wake-up target time is 6 a.m., and the sleep onset preparation time interval is 20 minutes, the electronic device 10 may determine 9:40 p.m. as the sleep onset preparation start time based on the sleep onset preparation time interval of 20 minutes, with respect to 10 p.m., which is 8 hours before 6 a.m.

The electronic device 10 may determine the sleep preparation start time based on sleep data recorded for the wearer 20. For example, if the predicted (e.g., determined) sleep onset time of the wearer 20 is 10 p.m. based on the sleep data, the electronic device 10 may determine 9:40 p.m. as the sleep onset preparation start time based on the sleep onset preparation time interval of 20 minutes with respect to 10 p.m as the predicted sleep onset time. For example, if the predicted sleep time of the wearer 20 is 8 hours and the predicted wake-up time is 6 a.m. based on the sleep data, the electronic device 10 may determine 9:40 p.m. as the sleep onset preparation start time based on the sleep onset preparation time interval of 20 minutes, with respect to 10 p.m., which is 8 hours before 6 a.m.

The electronic device 10 may change the sleep onset preparation start time in proportion (e.g., relative) to an increase or decrease in fatigue level. In one or more examples, the electronic device 10 may measure the fatigue level of the wearer 10 periodically or aperiodically and obtain a fatigue level change amount based on the measured value. The electronic device 10 may measure, for example, the fatigue level of the wearer 20 considering the eye closed duration, the number of blinks, the pupil diameter, the eyeball surface temperature, or the heart rate variability of the wearer 20. For example, if the fatigue level increases by the threshold in a situation where the adjustment time unit is 10 minutes and the sleep onset preparation start time is 9:40 μm, the electronic device 10 may change the sleep onset preparation start time to 9:30 pm. For example, if the fatigue level decreases by the threshold in a situation where the adjustment time unit is 10 minutes and the sleep onset preparation start time is 9:40 μm, the electronic device 10 may change the sleep onset preparation start time to 9:50 pm. An adjustment time unit (e.g., 20 minutes) for delaying the sleep onset preparation start time due to the decrease in the fatigue level may be different from an adjustment time unit (e.g., 10 minutes) for advancing the sleep onset preparation start time due to the increase in the fatigue level.

In operation 920, the electronic device 10 may generate, in a stepwise manner, over time, an sleep onset preparation screen with visual effects until the sleep onset preparation time interval elapses after reaching the sleep onset preparation start time.

More specifically, if the sleep onset preparation start time arrives, the electronic device 10 may display a sleep onset preparation guide message through the display. For example, the electronic device 10 may output, as the sleep onset preparation guide message, "It's time to get ready to sleep. Would you like to activate sleep onset preparation mode?" or "The fatigue level is high. Do you want to run the fatigue level minimize mode?" The electronic device 10 may display a button (e.g., "Yes" button) for confirming to execute the sleep onset preparation mode and/or a button (e.g., "No" button) for rejecting to execute the sleep onset preparation mode through the display. The electronic device 10 may determine whether to execute the sleep onset preparation mode based on the interaction with the wearer 20.

If the sleep onset preparation mode is executed, the electronic device 10 may decrease, in a stepwise manner, external stimulation such as visual stimulation and/or an auditory stimulation for a predetermined time (e.g., the sleep onset preparation time interval). The method for reducing, in a stepwise manner, the external stimulation may be determined based on the type of content service. The method for reducing, in a stepwise manner, the external stimulation may be determined based on the display mode applied to the display. For example, the electronic device 10 may generate, in a stepwise manner, a sleep onset preparation screen with visual effects in order to reduce visual stimulation over time. The electronic device 10 may generate, for example, a sleep onset preparation screen as a VST screen. The VST screen may be a screen including a virtual screen with the real screen as the background. In order to apply the visual effect to the VST screen in a stepwise manner, the electronic device 10 may reduce, in a stepwise manner, the proportion of the virtual screen occupied in the VST screen over time. The visual stimulation affecting the wearer 20 may be reduced in proportion to a decrease in the proportion occupied by the virtual screen in the VST screen.

The electronic device 10 may apply a visual effect of adjusting, in a stepwise manner, blue light for each of the objects included in the VST screen based on the passage of time considering the attributes of the objects. For example, the adjustment amount of blue light may be the same or different for each object. The electronic device 10 may apply, for example, a visual effect of increasing, in a stepwise manner, blue light that is evenly or differentially adjusted for each of the objects, over time, to the VST screen. The attributes of the objects may be one of the real screen (e.g., non-virtual screen) or the virtual screen including the corresponding object, whether the corresponding object emits light or the light source type of the corresponding object.

The electronic device 10 may apply a visual effect of adjusting, in a stepwise manner, the illuminance of each of the objects included in the VST screen based on the passage of time considering the attributes of the objects. In this case, the adjustment amount of illuminance may be the same or different for each object. The electronic device 10 may apply, for example, a visual effect of increasing, in a stepwise manner, illuminance that is evenly or differentially adjusted for each of the objects over time to the VST screen. The attributes of the objects may be one of the real screen or the virtual screen including the corresponding object, whether the corresponding object emits light or the light source type of the corresponding object.

In operation 930, the electronic device 10 may display an sleep onset preparation screen through the display. The visual effect, applied to the sleep onset preparation screen in a stepwise manner, may be changed over time.

The electronic device 10 may periodically or aperiodically repeat operations (920 and 930) until the sleep onset preparation time elapses, thereby sequentially decreasing the degree of the sleep onset obstruction to the wearer 20. The electronic device 10 may reduce, in a stepwise manner, auditory stimulation due to audio output by the content service based on the passage of time during the sleep onset preparation time interval. The electronic device 10 may output a sound (e.g., a sleep leading sound) helpful for the sleep onset instead of audio according to the content service during the sleep onset preparation time interval.

Figure 10:
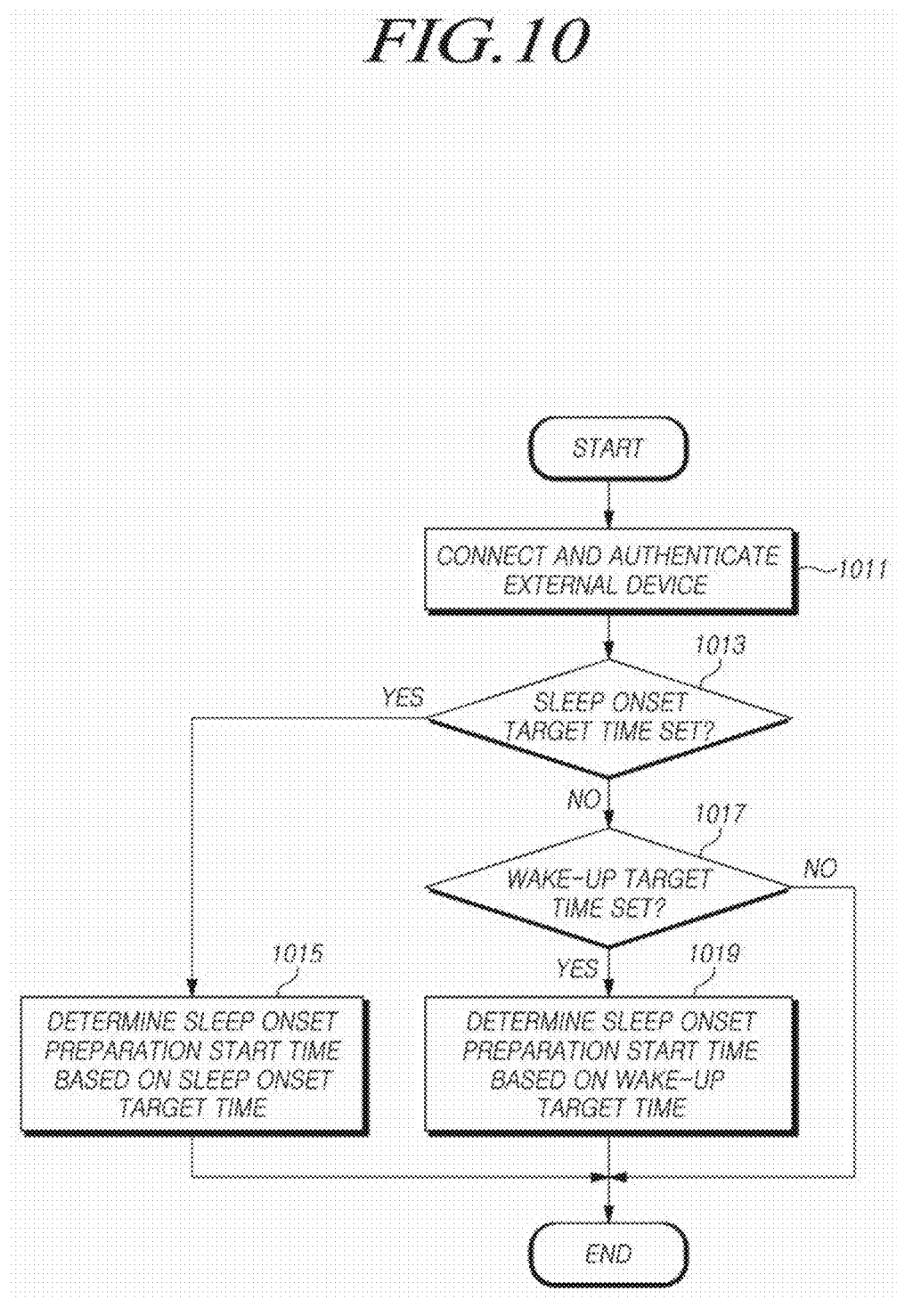
FIG. 10 is a control flowchart illustrating an example sleep onset preparation start time determination in an electronic device according to one or more embodiments.

FIG. 10 is a control flowchart illustrating an example process for determining a sleep onset preparation start time in an electronic device (e.g., the HMD device 10 of FIG. 1) according to one or more embodiments.

Referring to FIG. 10, in operation 1011, the electronic device 10 may be connected to an external device (e.g., the smartphone 30 of FIG. 1) through a communication link based on a predetermined communication scheme (e.g., a wireless short-range communication scheme). The electronic device 10 may perform an authentication procedure (e.g., account recognition) for protecting personal information with the external device 30.

If the connection and/or authentication with the external device 30 is completed, the electronic device 10 may determine whether a sleep onset target time is set in operation 1013. The sleep onset target time may be set by the user 20 in the external device 30 for the sleep onset.

If the sleep onset target time is set, the electronic device 10 may determine the sleep onset preparation start time based on the sleep onset target time in operation 1015. For example, the sleep onset preparation start time may be determined taking into account the sleep onset preparation time for the sleep onset target time. The sleep onset preparation time interval may be preset. For example, if the sleep onset target time is 9 p.m. and the sleep onset preparation time interval is 30 minutes, the electronic device 10 may determine the sleep onset preparation start time as 8:30 p.m.

If the connection and/or authentication with the external device 30 is completed, in operation 1017, the electronic device 10 may determine whether a wake-up target time is set (e.g., a wake-up alarm is set). The wake-up target time may be set by the user 20 in the external device 30 for wake-up.

If the wake-up target time is set, the electronic device 10 may determine the sleep onset preparation start time based on the wake-up target time in operation 1019. In this case, the electronic device 10 may additionally consider the sleep time of the user 20. The user's sleep time may be set in the external device 30 by the user 20. The user's sleep time may be determined by an average sleep time obtained by analyzing sleep data provided by the external device 30. As an example, the sleep onset preparation start time may be determined considering the wake-up target time, the predicted sleep time, and the sleep onset preparation time interval. The sleep onset preparation time interval may be preset. For example, if the wake-up target time is 6 a.m., the predicted sleep time is 8 hours, and the sleep onset preparation time interval is 30 minutes, the electronic device 10 may determine the sleep onset preparation start time as 9:30 p.m.

Figure 11:
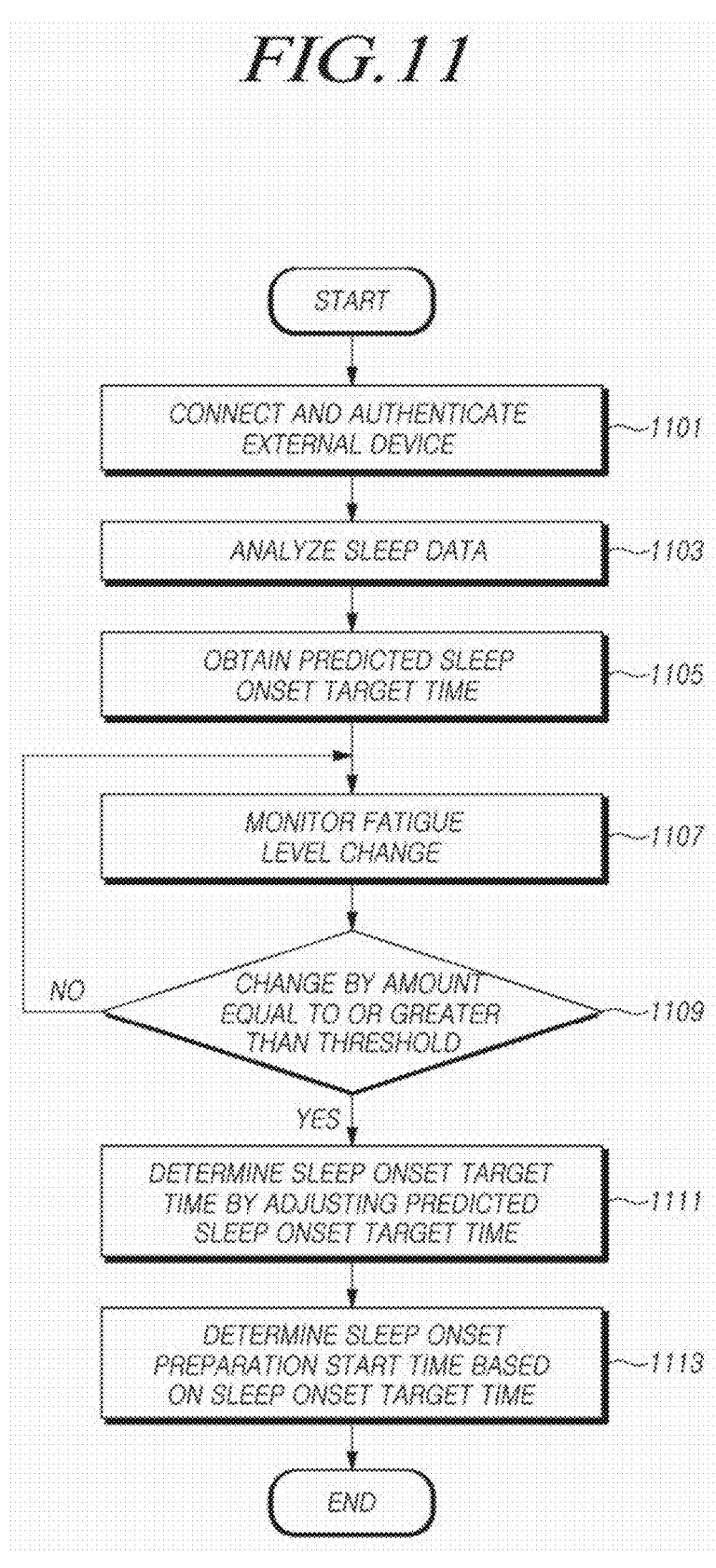
FIG. 11 is a control flowchart illustrating an example sleep onset preparation start time determination in an electronic device according to one or more embodiments.

FIG. 11 is a control flowchart illustrating an example process for determining a sleep onset preparation start time in an electronic device (e.g., the HMD device 10 of FIG. 1) according to one or more embodiments.

Referring to FIG. 11, in operation 1101, the electronic device 10 may be connected to an external device (e.g., the smartphone 30 of FIG. 1) through a communication link based on a predetermined communication scheme (e.g., a wireless short-range communication scheme). The electronic device 10 may perform an authentication procedure (e.g., account recognition) for protecting personal information with the external device 30.

If the connection and/or authentication with the external device 30 is completed, the electronic device 10 may receive sleep data for a predetermined period (e.g., 3 months) from the external device 30 in operation 1103. The electronic device 10 may analyze the sleep data. For example, the electronic device 10 may analyze the average sleep time of the user 20 for each day of the week based on the sleep data. For example, the electronic device 10 may analyze the sleep onset time of the user 20 for each day of the week based on the sleep data.

In operation 1105, the electronic device 10 may obtain a predicted sleep onset target time based on the analyzed average sleep time for each day of the week of the user 20 or the analyzed sleep onset time for each day of the week of the user 20. The predicted sleep onset target time may be a sleep onset time predicted to be desired by the user 20.

In operation 1107, the electronic device 10 may monitor a change in fatigue level of the user 20. The electronic device 10 may measure a change in fatigue level of the user 20 considering biometric information provided from an external device (e.g., the smartphone 30 or the wearable device 40 of FIG. 1). The electronic device 10 may periodically or aperiodically measure the fatigue level of the user 20 and evaluate a weighted value according to the amount of change. In order to periodically measure the fatigue level, the electronic device 10 may preset a period (e.g., 30 minutes) for measuring the fatigue level. In order to aperiodically measure the fatigue level, the electronic device 10 may monitor the occurrence of an aperiodic event. The aperiodic event may be, for example, a movement in which the user 20 suddenly moves his head down and up. This may be detected by a sensing signal by at least one sensor. As an example, the electronic device 10 may evaluate a real-time weighted fatigue level based on the monitored fatigue level change.

In operation 1109, the electronic device 10 may determine whether the fatigue level has changed by an amount equal to or greater than the threshold. For example, the electronic device 10 may determine whether the number of blinks of the user 20 has increased by at least a predetermined number. For example, the electronic device 10 may determine whether the eye closed duration of the user 20 has increased for a predetermined time. For example, the electronic device 10 may determine whether the pupil diameter of the user 20 is increased by a predetermined size. For example, the electronic device 10 may determine whether the eyeball surface temperature of the user 20 has increased by at least a predetermined value. For example, the electronic device 10 may determine whether the heart rate variability (HRV) of the user 20 has increased by at least a predetermined level. The electronic device 10 may determine that the fatigue level has increased if an amount of change capable of predicting an abnormal level occurs in at least one or more items (e.g., the number of blinks, the closed eyes duration, or the pupil diameter) for measuring the fatigue level.

if it is determined that the fatigue level has increased by an amount above (or greater than) the threshold level, the electronic device 10 may adjust the predicted sleep onset target time based on the real-time weighted value (or level) corresponding to the fatigue level increase level in operation 1111. As an example, the electronic device 10 may change the sleep onset target time in proportion to an increase or decrease in fatigue level. For example, if the adjustment time unit is 10 minutes, the electronic device 10 may reduce the sleep onset target time by every 10 minutes if the fatigue level increases by a threshold value. For example, if the adjustment time unit is 10 minutes, the electronic device 10 may reduce the sleep onset target time by every 10 minutes if the fatigue level increases by the threshold. For example, if the sleep onset target time is 9:40 p.m. and the fatigue level decreases by the threshold or more, the electronic device 10 may change the sleep onset target time to 9:50 p.m.

In operation 1113, the electronic device 10 may determine the sleep onset preparation start time based on the determined the sleep onset target time. The electronic device 10 may start the sleep onset preparation at the sleep onset preparation start time.

Figure 12A:
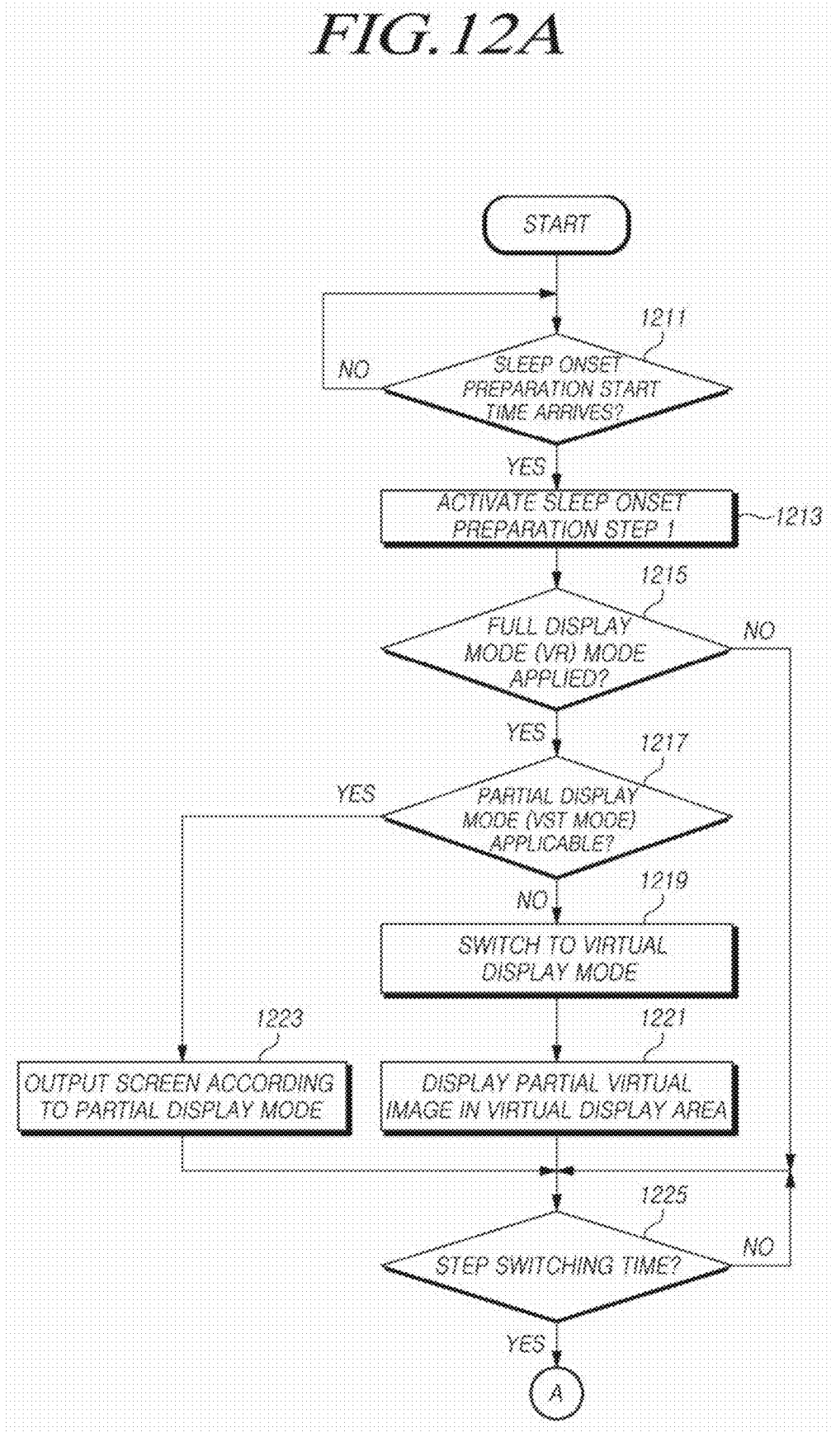
FIGS. 12A and 12B are control flowcharts illustrating an example process for preparing for sleep onset in an electronic device according to one or more embodiments.
Figure 12B:
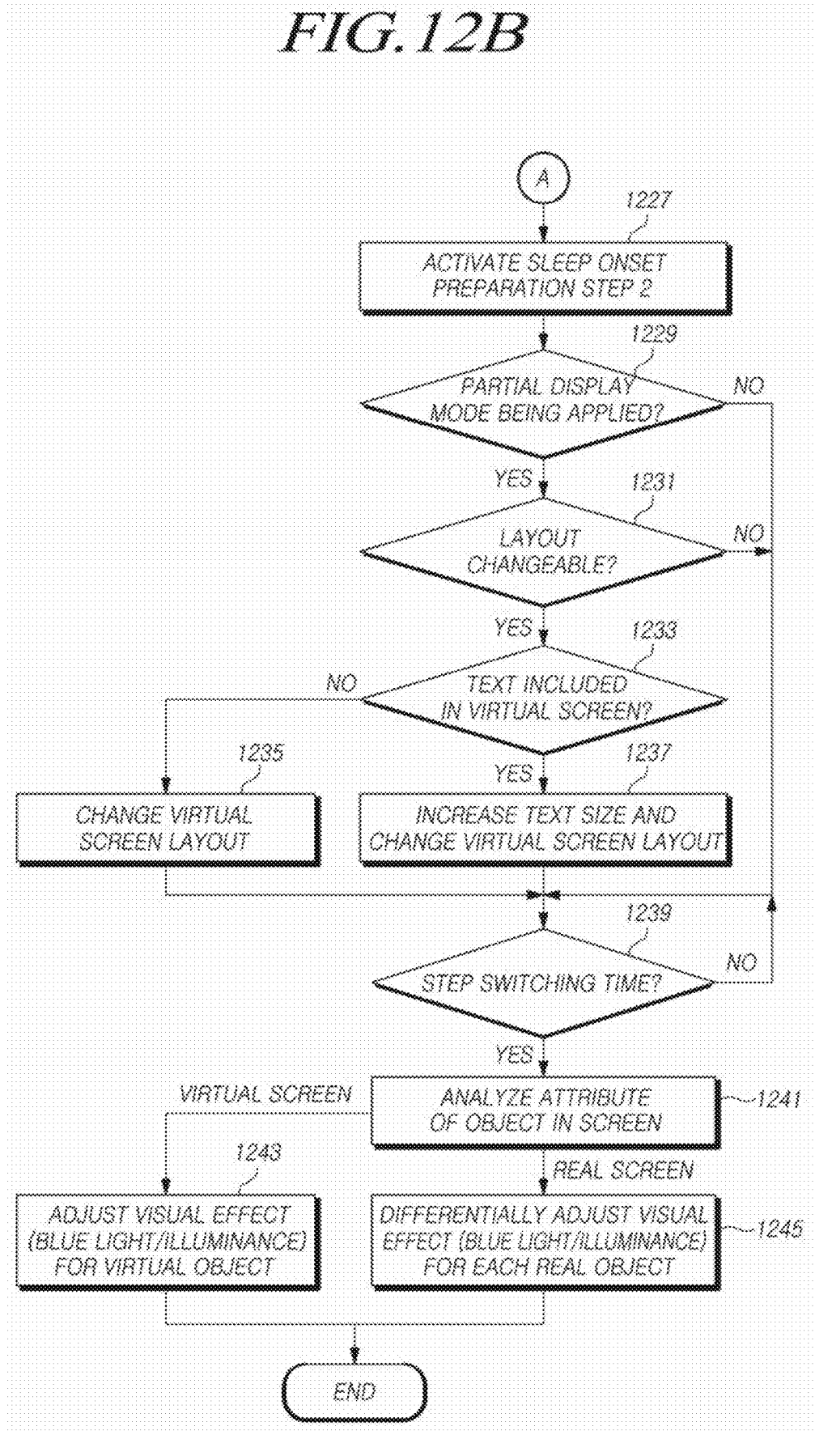

FIGS. 12A and 12B are control flowcharts illustrating an example process for preparing for sleep onset in an electronic device (e.g., the HMD device 10 of FIG. 1) according to one or more embodiments.

Referring to FIG. 12A or FIG. 12B, in operation 1211, the electronic device 10 may determine whether a sleep onset preparation start time arrives. If the time has reached the sleep onset preparation start time, in operation 1213, the electronic device 10 may activate a mode in which the sleep onset preparation operation according to sleep onset preparation step 1 is to be performed. For example, the electronic device 10 may display the sleep onset preparation guide message through the display. The electronic device 10 may output, through the display, for example, "It's time to get ready to sleep. Do you want to run sleep onset preparation mode?" as the sleep onset preparation guide message. The electronic device 10 may display a button (e.g., "Yes" button) for confirming execution and/or a button (e.g., "No" button) for rejecting execution together with the sleep onset preparation guide message. The electronic device 10 may determine whether to execute the sleep onset preparation mode in response to one (1) button selected from the two (2) buttons based on the interaction with the user 20.

If sleep onset preparation step 1 is activated, in operation 1215, the electronic device 10 may determine whether the full display mode (e.g., VR mode) in which the virtual screen according to the content service is displayed through the entire area of the display is applied. If it is determined that the full display mode is not applied, the electronic device 10 may determine that the partial display mode (e.g., VST mode) is being applied and proceed to operation 1225 for step switching.

If it is determined that the full display mode is applied, the electronic device 10 may determine whether the partial display mode (e.g., VST mode) is applicable in operation 1217. For example, the electronic device 10 may determine whether there is a switchable partial display mode (e.g., VST mode) option in the content service providing the virtual screen by the full display mode.

If the partial display mode is applicable, the electronic device 10 may output a screen (e.g., a VST screen) according to the partial display mode through the display in operation 1223. The VST screen according to the partial display mode may be a composite screen (e.g., the composite screen 441 of FIG. 4) obtained by synthesizing a virtual screen (e.g., the virtual screen 431 of FIG. 4) with a real screen (e.g., the real screen 411 of FIG. 4) as the background.

If the partial display mode is not applicable, the electronic device 10 may switch to the virtual display mode in operation 1219. If switching to the virtual display mode, the electronic device 10 may display a partial virtual image in the virtual display area in operation 1221. For example, the electronic device 10 may determine the field of view of the user 20 based on head position information (e.g., head position information 421 of FIG. 4) of the user 20. The electronic device 10 may obtain a partial virtual screen according to the field of view in the entire virtual screen. The electronic device 10 may display the partial virtual screen in the virtual display area.

In operation 1225, the electronic device 10 may determine whether the time has reached a step switching time. The step switching time may arrive, after a predetermined time (e.g., N minutes, where N is a positive integer) elapses, after sleep onset preparation step 1 is activated. The electronic device 10 may perform an operation, according to sleep onset preparation step 1, until the time reaches the step switching time.

If the time reaches step switching time, in operation 1227, the electronic device 10 may activate a mode in which the sleep onset preparation operation according to sleep onset preparation step 2 is to be performed. For example, the electronic device 10 may adjust the layout of the virtual screen in the VST screen according to the partial display mode in sleep onset preparation step 2. The adjustment of the layout may include adjusting a distance between the virtual screen and the user 20 in the VST screen (see FIG. 14A). The adjustment of the layout may include adjusting the size of the virtual screen in the VST screen (see FIG. 14B).

More specifically, if sleep onset preparation step 2 is activated, in operation 1229, the electronic device 10 may determine whether the partial display mode (e.g., VST mode) is being applied. If the partial display mode is not being applied, the electronic device 10 may determine that there is no option for supporting the partial display mode (e.g., VST mode) in the corresponding content service and may proceed to operation 1239 for step switching.

If the partial display mode is being applied, the electronic device 10 may determine whether it is possible to change the layout of the partial display screen (VST screen) according to the partial display mode in operation 1231. For example, if it is determined that the separation distance between the user 20 and the virtual screen is within a threshold distance, the electronic device 10 may determine that the layout may be changed.

If it is possible to change the layout of the virtual screen, the electronic device 10 may determine whether the virtual screen includes text in operation 1233. In one or more examples, the electronic device 10 may analyze the attribute of the content providing the virtual screen. If it is determined that the analyzed attribute of the content may not include text, in operation 1235, the electronic device 10 may change the layout by applying a display effect of decreasing the size of the virtual screen or increasing the distance from the user 20 (see FIG. 14A or FIG. 14B). If it is determined that the analyzed attribute of the content may include text, in operation 1237, the electronic device 10 may increase the size of the text included in the virtual screen and may change the layout by applying a display effect of decreasing the size of the virtual screen or increasing the distance from the user 20.

In operation 1239, the electronic device 10 may determine whether the time has reached a step switching time. The step switching time may arrive, after a predetermined time (e.g., N minutes, where N is a positive integer) elapses, after sleep onset preparation step 2 is activated. The electronic device 10 may perform an operation according to sleep onset preparation step 2 until the time reaches the step switching time.

If the step switching time arrives, the electronic device 10 may perform the sleep onset preparation operation according to sleep onset preparation step 3. For example, in operation 1241, the electronic device 10 may detect objects included in the screen and analyze the attributes of each of the detected objects. The electronic device 10 may apply differently the visual effect to the virtual object (e.g., the object detected on the virtual screen (rendered image)) or the real object (e.g., the object detected on the real screen (photographed image)) according to the analysis result (e.g., refer to FIG. 15). For example, in operation 1243, the electronic device 10 may adjust a visual effect (e.g., blue light and/or illuminance) on the virtual object (e.g., see FIG. 16D). For example, in operation 1245, the electronic device 10 may differentially adjust the visual effect (e.g., blue light and/or illuminance) for each real object (see FIG. 16B). For example, the electronic device 10 may divide light emitting objects among real objects and may differentially adjust the visual effect (e.g., blue light and/or illuminance) of the masking area for each type (e.g., the natural light source, the artificial light source, or the real display) of the light emitting object. The masking area may be an area set to apply a visual effect (e.g., adjust blue light or illuminance) to each light emitting object. The electronic device 10 may apply a differentiated visual effect (e.g., blue light and/or illuminance) to the masking area of the remaining real objects except for the light emitting objects among the real objects.

Figure 13A:
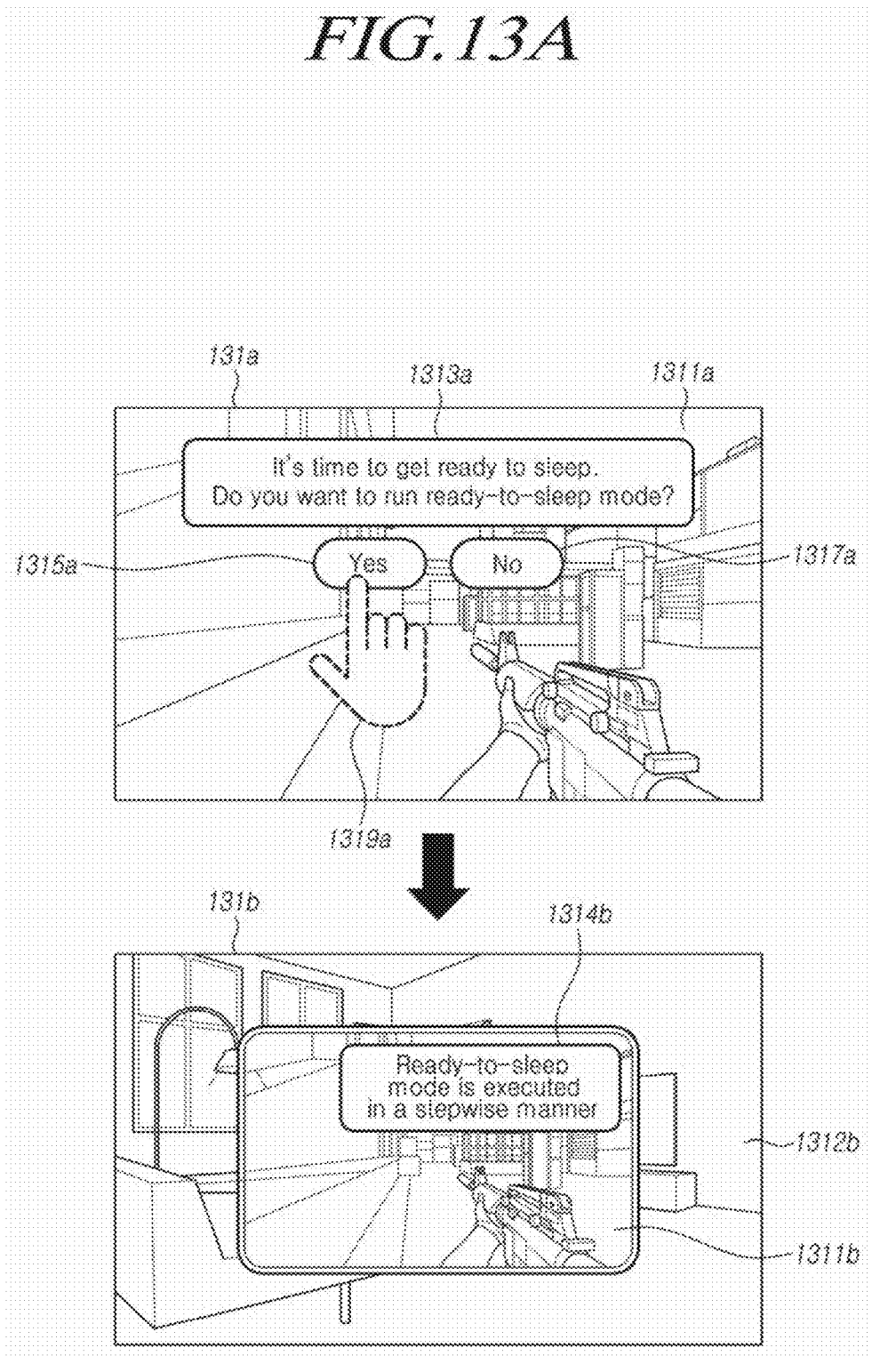
FIGS. 13A, 13B, and 13C are views illustrating an example screen to which a visual effect may be applied per sleep onset preparation step in an electronic device according to one or more embodiments.
Figure 13B:
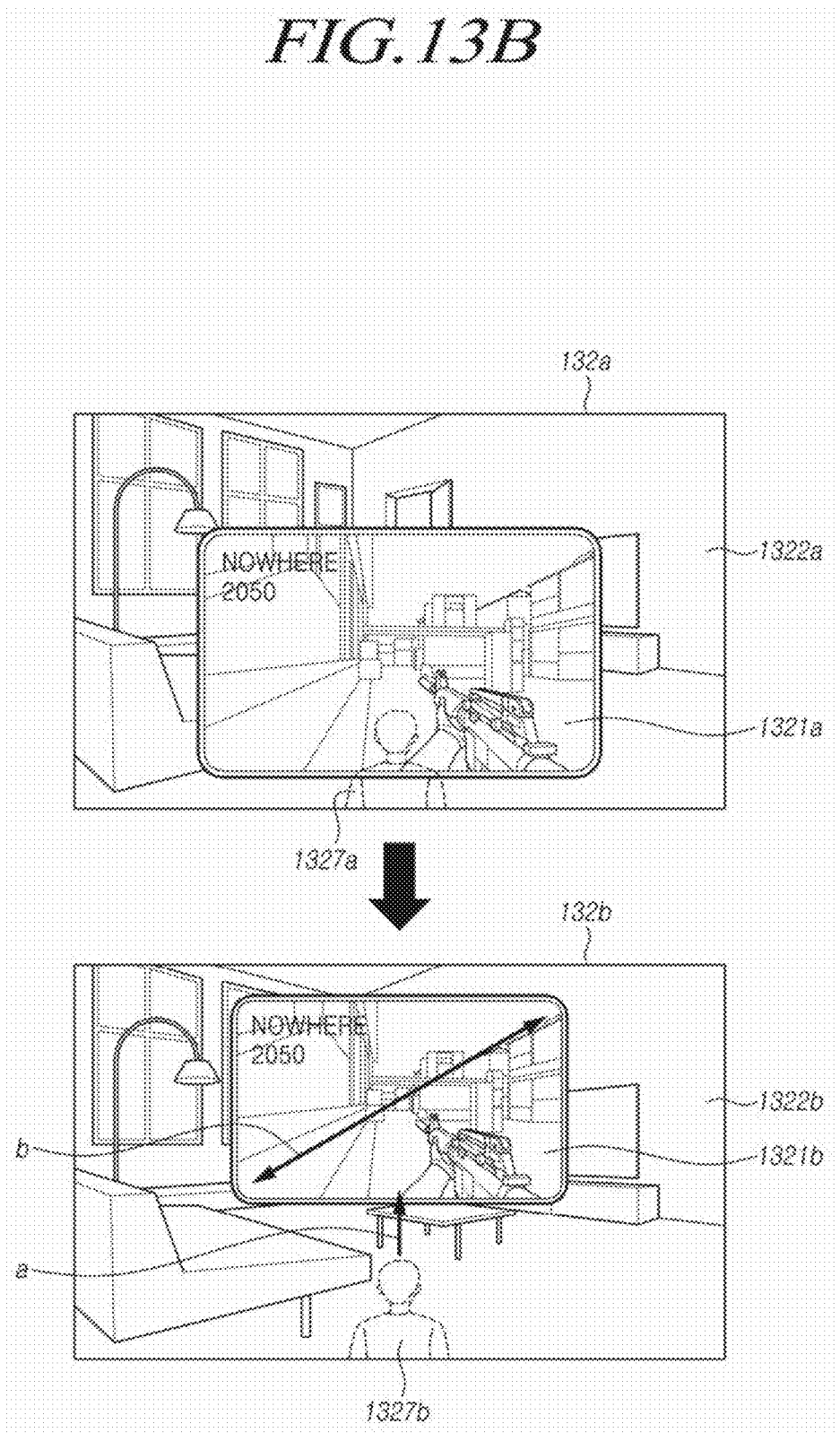
Figure 13C:
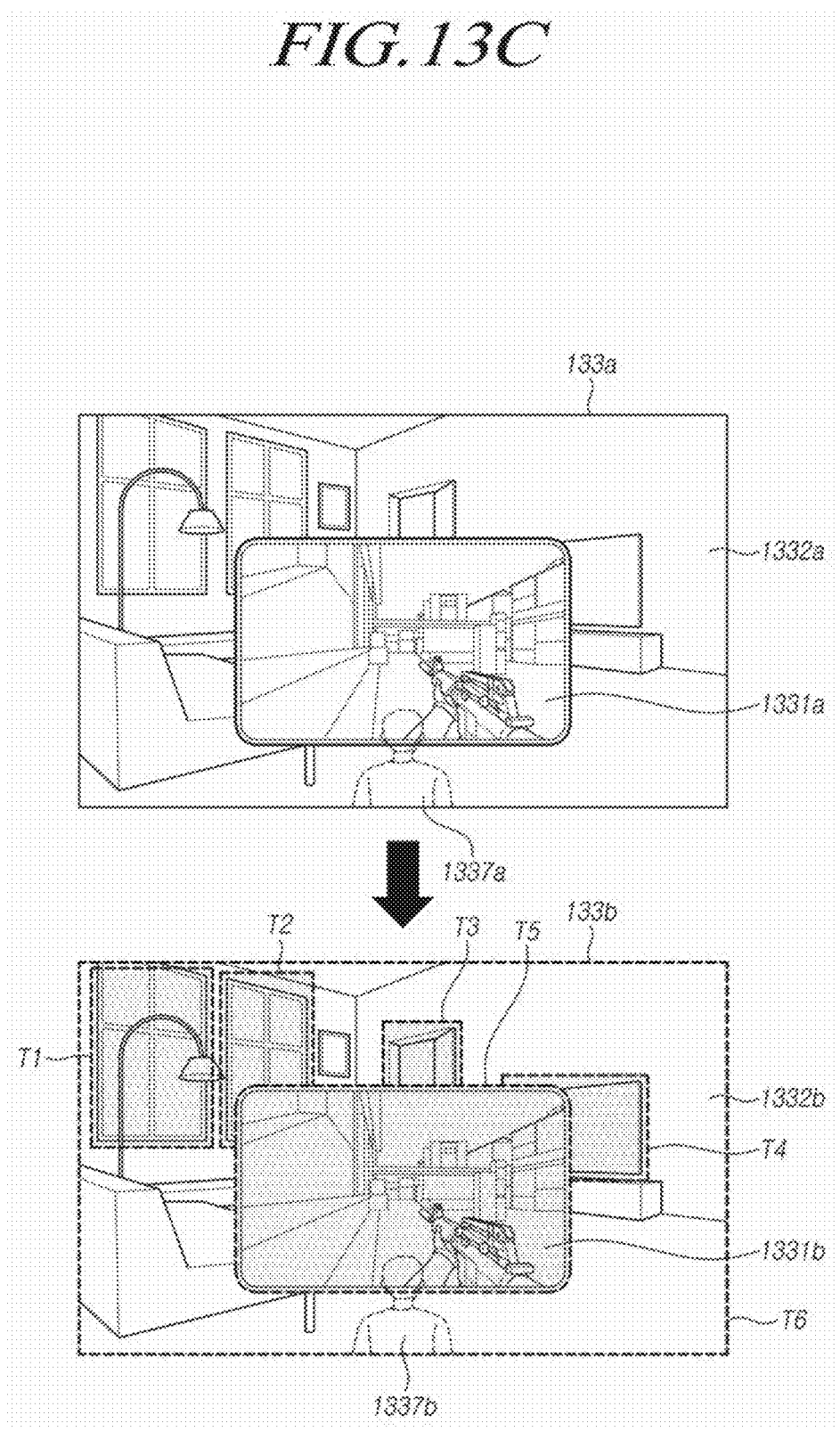

FIGS. 13A, 13B, and 13C are views illustrating an example screen to which a visual effect may be applied per sleep onset preparation step in an electronic device (e.g., the HMD device 10 of FIG. 1) according to one or more embodiments.

Referring to FIG. 13A, if sleep onset preparation step 1 is activated (e.g., the sleep onset preparation start time), the electronic device 10 may display, through the display, a full display screen 131a including the manipulation guide 1313a "It's time to get ready to sleep. Do you want to run sleep onset preparation mode?" and a button (e.g., "Yes" button) 1315a for instructing execution and/or a button (e.g., "No" button) 1317a for instructing not to execute, overlapping the virtual screen 1311a. The electronic device 10 may select one of the "Yes" button 1315a or the "No" button 1317a by interaction with the user 20 (1319a). In one or more examples, the "Yes" or "No" button may be activated by the user operating an external device connected to the electronic device 10, the user providing a verbal command, or the user mimicking a motion indicating a selection of the "Yes" or "No" button.

If the "Yes" button 1315a is selected by the user 20, the electronic device 10 may switch the full display screen 131a (e.g., VR screen) to the partial display screen 131b (e.g., VST screen). The partial display screen 131b may be a screen obtained by synthesizing (e.g., incorporating or combining) the virtual screen 1311b according to the content service with the real screen 1312b based on the captured image. The real screen 1312b or the virtual screen 1311b may include the guide message 1314b "The sleep preparation mode is executed in a stepwise manner." The guide message 1314b may be displayed over the real screen 1312b and the virtual screen 1311b.

Referring to FIG. 13B, the electronic device 10 may switch the first partial display screen 132a to the second partial display screen 132b if sleep onset preparation step 2 is activated (e.g., when a predetermined time elapses from the sleep onset preparation start time). The second partial display screen 132b may be a screen in which a predetermined visual effect is applied to the first partial display screen 132a. For example, the first partial display screen 132a may be a screen obtained by synthesizing the first virtual screen 1321a according to the content service with the first reality screen 1322a based on the captured image. For example, the second partial display screen 132b may be a screen obtained by synthesizing the second virtual screen 1321b according to the content service with the second reality screen 1322b based on the captured image. For example, a visual effect b for reducing the size of the virtual screen 1321a in the first partial display screen 132a may be applied to the second partial display screen 132b. A visual effect of increasing the distance from the users 1327a and 1327b as compared with the first virtual screen 1321a included in the first partial display screen 132a may be applied to the second virtual screen 1321b included in the second partial display screen 132b. However, the size of the text (e.g., NOWHERE 2050) included in the first virtual screen 1321a may remain the same on the second virtual screen 1321b.

Referring to FIG. 13C, the electronic device 10 may switch the third partial display screen 133a to the fourth partial display screen 133b if sleep onset preparation step 3 is activated (e.g., when a predetermined time elapses from the time when sleep onset preparation step 2 is activated). The fourth partial display screen 133b may be a screen in which a predetermined visual effect is applied to the third partial display screen 133a. For example, the third partial display screen 133a may be a screen obtained by synthesizing the third virtual screen 1331a according to the content service with the third reality screen 1332a based on the captured image. For example, the fourth partial display screen 133b may be a screen obtained by synthesizing the fourth virtual screen 1331b according to the content service with the fourth reality screen 1332b based on the captured image. For example, a visual effect (e.g., blue light and/or illuminance) may be differentially applied to the fourth partial display screen 133b for each masking area T1, T2, T3, and T4. The masking areas T1, T2, T3, and T4 may be determined for each of the light emitting objects (e.g., a stand, a window, a door, and a TV) among the real objects included in the third real screen 1332a in the third partial display screen 133a. The fourth partial display screen 133b may include, for example, a fourth virtual screen 1331b in which a visual effect (e.g., blue light and/or illuminance) is applied to the third partial display screen 133a in the third virtual screen 1331a.

Figure 14A:
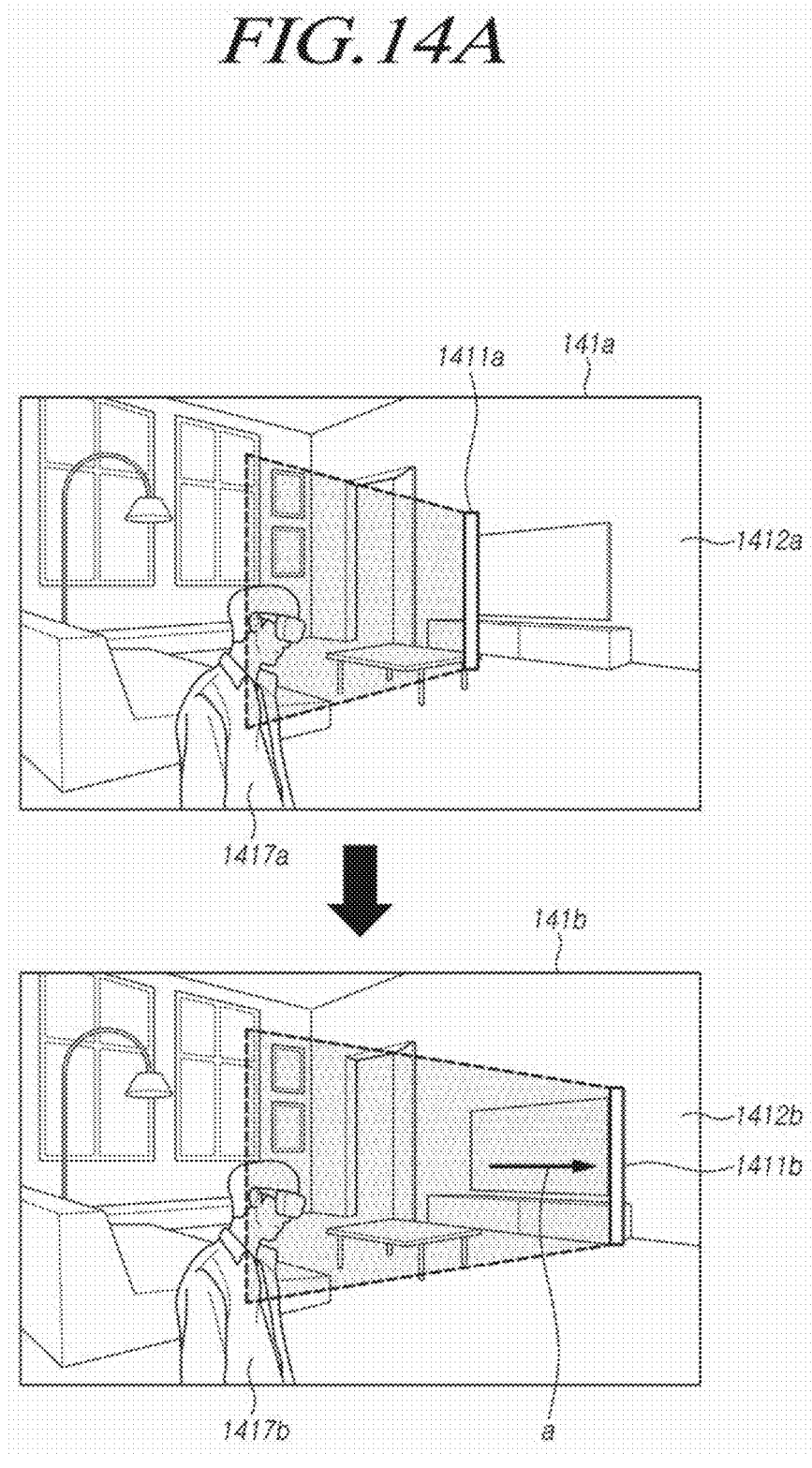
FIG. 14A is a view illustrating an example of implementing a visual effect (a) for changing a depth in screen in FIG. 13B.

FIG. 14A is a view illustrating an example of implementing a visual effect (a) for changing a depth in screen in FIG.

Figure 14B:
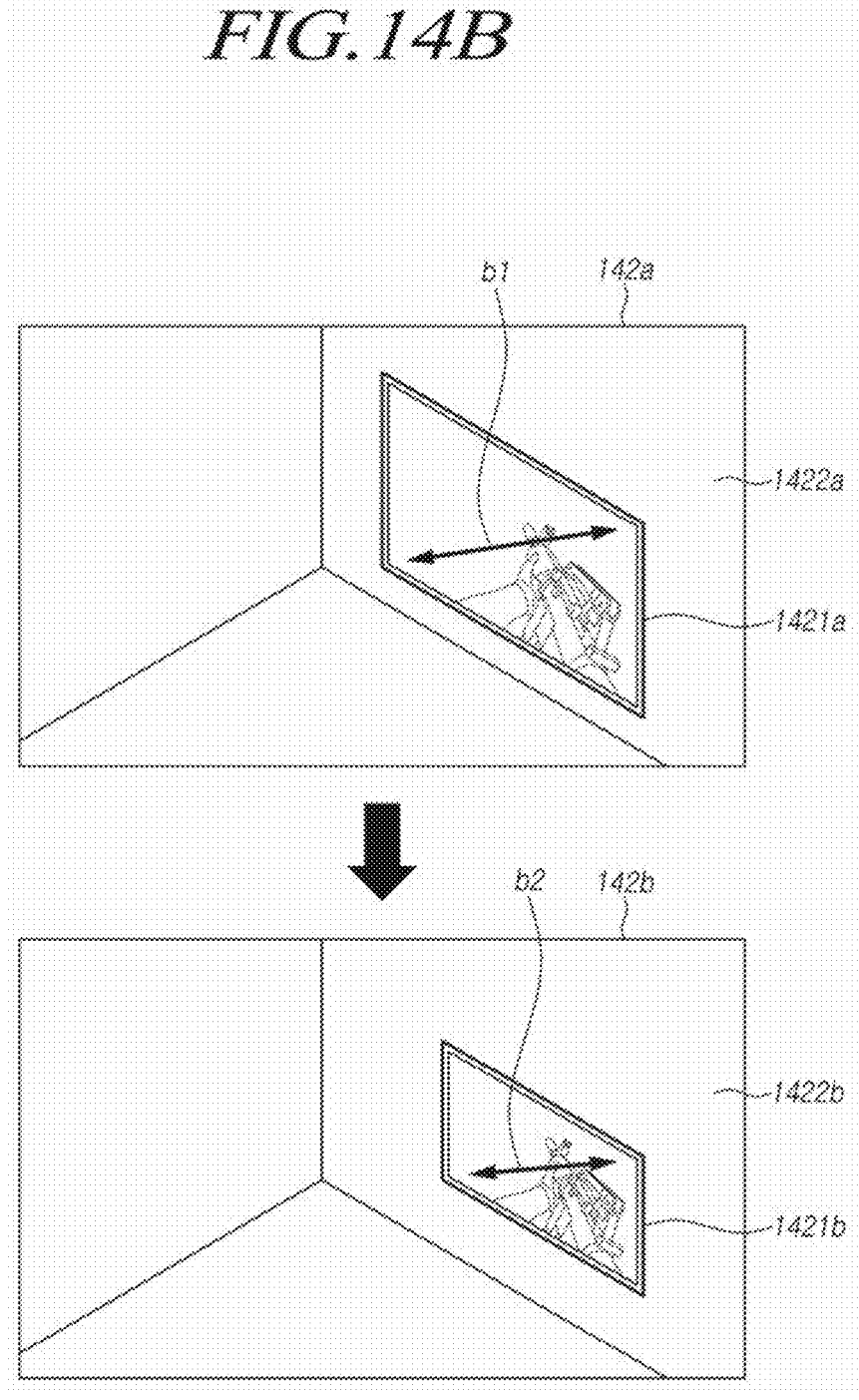
FIG. 14B is a view illustrating an example of implementing a visual effect (b) for changing a screen size in FIG. 13B.

13B. FIG. 14B is a view illustrating an example of implementing a visual effect (b) for changing a screen size in FIG. 13B.

Referring to FIG. 14A, the virtual screen 1411*b* synthesized to the real space 1412*b* on the partial display screen 141*b* after the visual effect a is applied may have a relatively larger separation distance from the users (1417*a* and 1417*b*) than the virtual screen 1411*a* synthesized to the real space 1412*a* on the partial display screen 141*a* before the visual effect a is applied. In this case, after the visual effect a is applied to the users (1417*a* and 1417*b*), the immersion level of the screen may be lowered.

Referring to FIG. 14B, the virtual screen 1411*b* synthesized to the real space 1412*b* on the partial display screen 141*b* after the visual effect b is applied may have a smaller screen size (b1>b2) than the virtual screen 1411*a* synthesized to the real space 1412*a* on the partial display screen 141*a* before the visual effect a is applied. In this case, due to the visual effect b being applied in the stepwise manner, the user may be less immersed in the screen after the visual effect b is applied.

Figure 15:
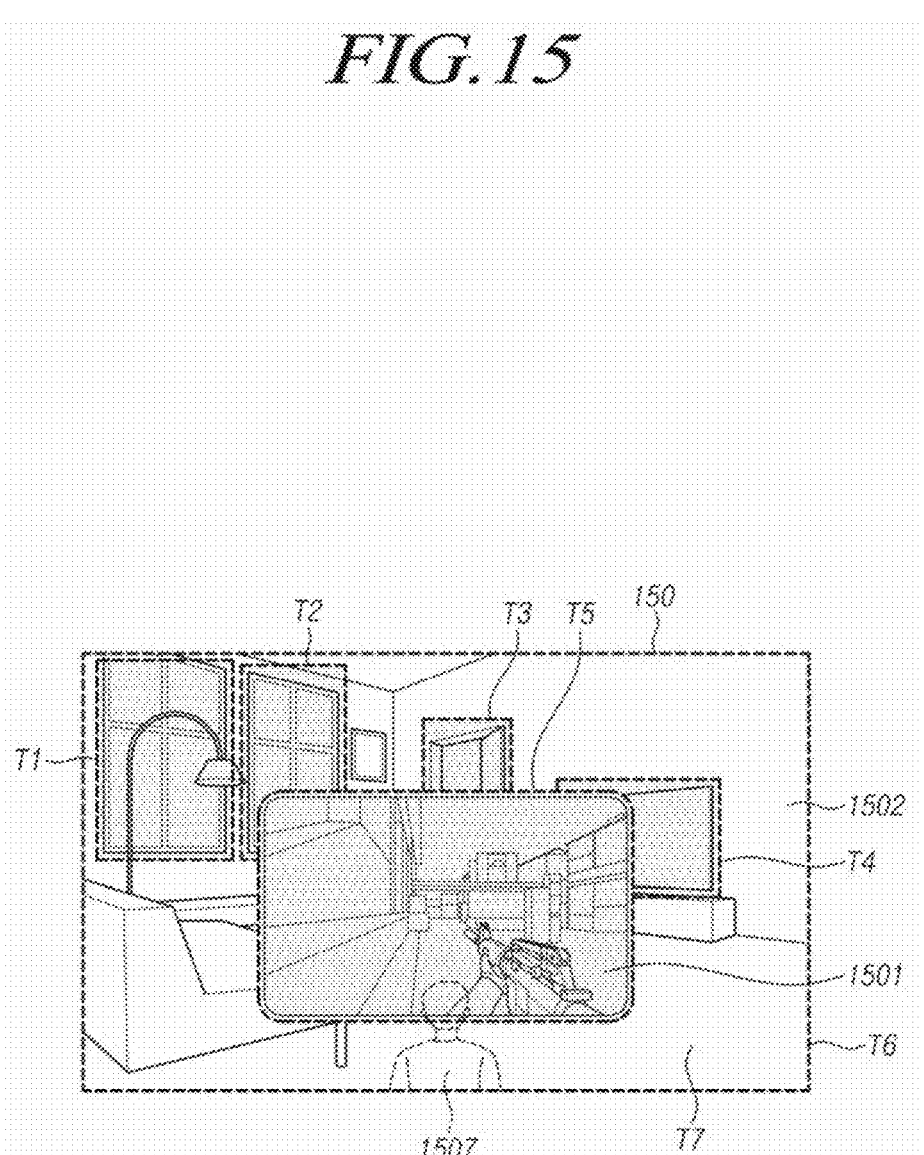
FIG. 15 is a view illustrating an example in which a visual effect applies to each object in an electronic device according to one or more embodiments.

FIG. 15 is a view illustrating an example in which a visual effect applies to each object in an electronic device (e.g., the HMD device 10 of FIG. 1) according to one or more embodiments.

Referring to FIG. 15, in sleep onset preparation step 3, a visual effect (e.g., blue light and/or illuminance) may be differentially applied to the masking areas (T1, T2, T3, T4, T5, and T6) selecting target objects according to attributes. For example, the first masking area T1 selects a stand (artificial light) which is one of the light emitting objects included in the real screen 1502, the second masking area T2 selects a window (e.g., natural light) which is one of the light emitting objects included in the real screen 1502, the third masking area T3 selects an entrance door (other indoor space light) which is one of the light emitting objects included in the real screen 1502, and the fourth masking area T4 selects a TV (real display light) which is one of the light emitting objects included in the real screen 1502. The fifth masking area T5 selects the entire virtual area 1501, the sixth masking area T6 selects the entire real screen 1502, and the seventh masking area T7 selects an area other than the light source on the real screen 1502.

In one or more examples, illuminance and/or blue light may be differentially applied to the first to fourth masking areas (T1, T2, T3, and T4) selecting light emitting objects on the real screen 1502. For example, blue light and/or illuminance may be selectively and/or applied, in a stepwise manner, to the fifth masking area T5 selecting the entire area of the virtual screen 1501 and/or the sixth masking area T6 selecting the entire area of the real screen 1502. For example, both blue light and illuminance may be applied in a stepwise manner to the seventh masking area T7 selecting an area other than the light source on the real screen 1502. As a result of the masking, the illuminance and/or blue light may be reduced in a stepwise manner, thereby preventing activation of a sympathetic nerve of the user.

FIGS. 16A to 16F are views illustrating an example of applying a visual effect in an electronic device (e.g., the HMD device 10 of FIG. 1) according to one or more embodiments.

Figure 16A:
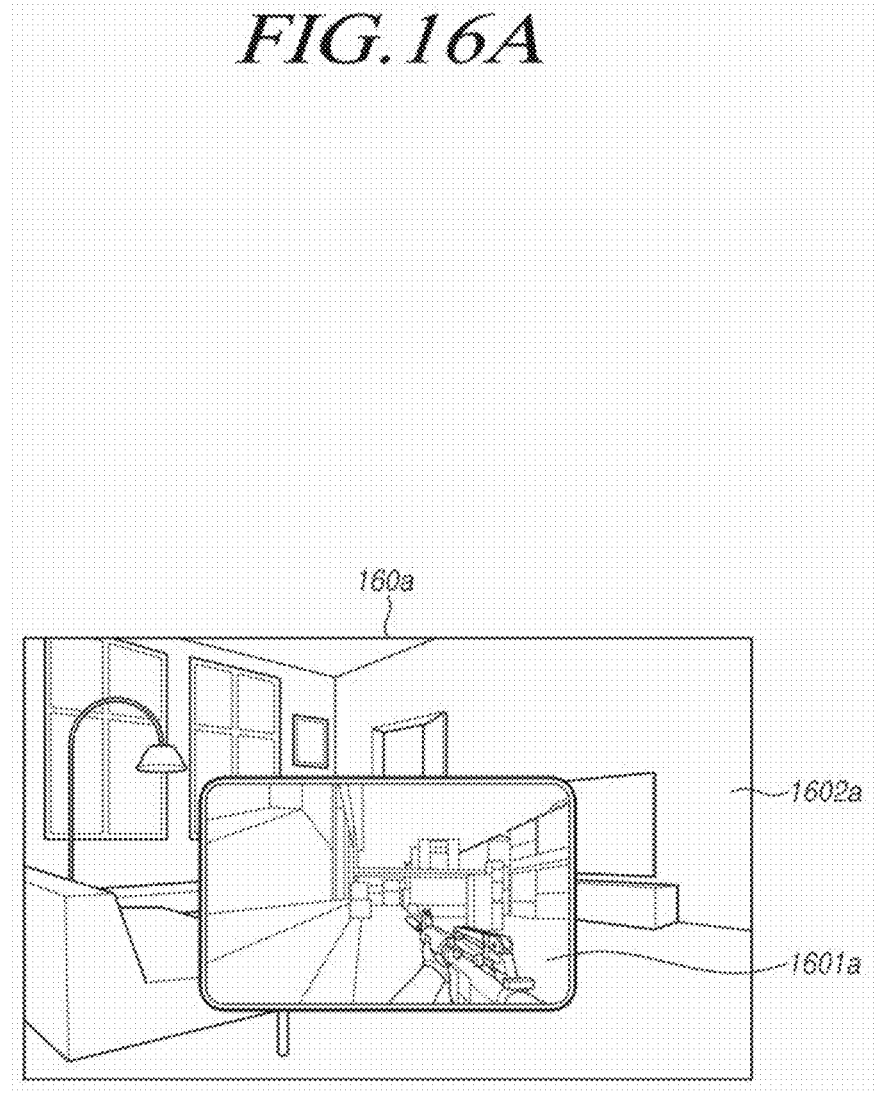
FIGS. 16A, 16B, 16C, 16D, 16E, and 16F are views illustrating an example of applying a visual effect in an electronic device according to one or more embodiments.
Figure 16B:
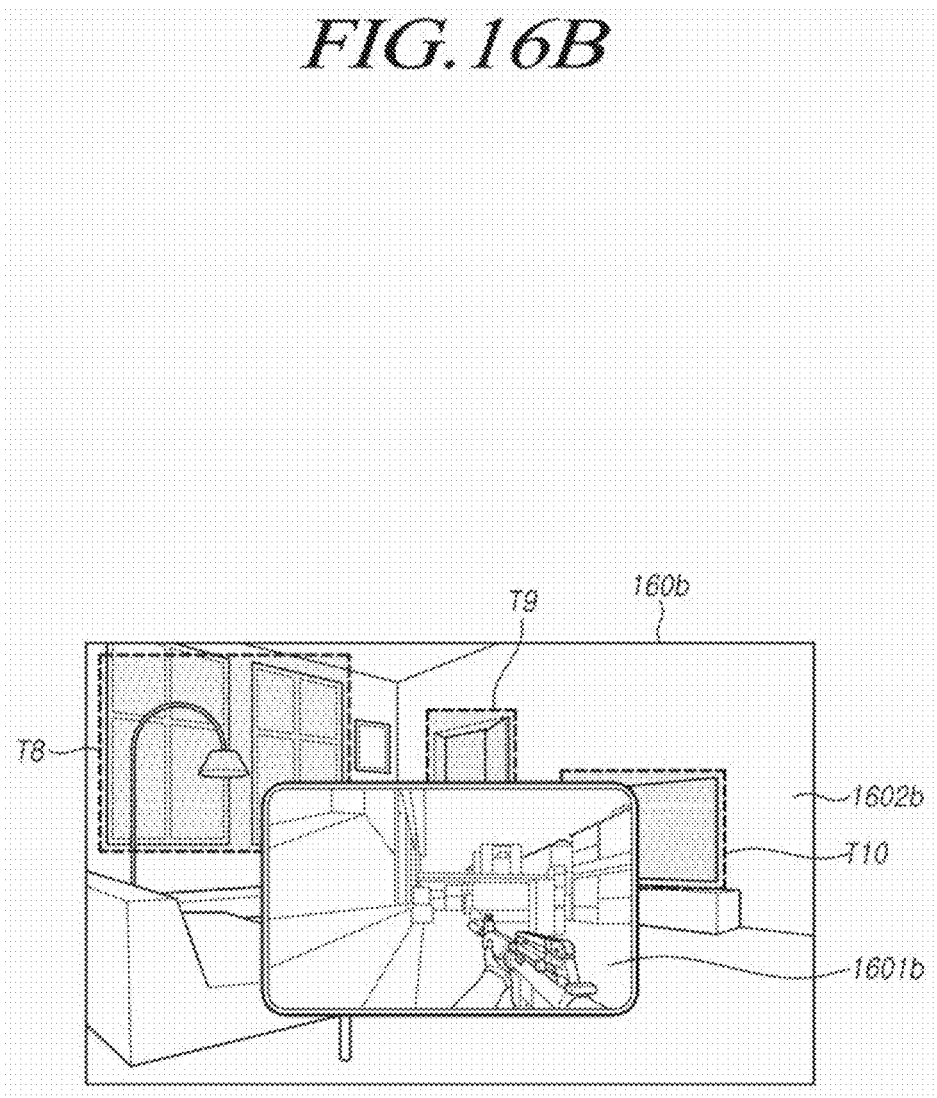

A partial display screen 160*a* of FIG. 16A may be a VST screen to which a visual effect (e.g., blue light) is not applied, and a partial display screen 160*b* of FIG. 16B may be a VST screen to which a visual effect (e.g., blue light) is applied to masking areas (T8, T9, and T10) selected for light emitting objects included in a real screen 1602*b*, and a visual effect (e.g., blue light) is not applied to a virtual screen 1601*b*.

Figure 16C:
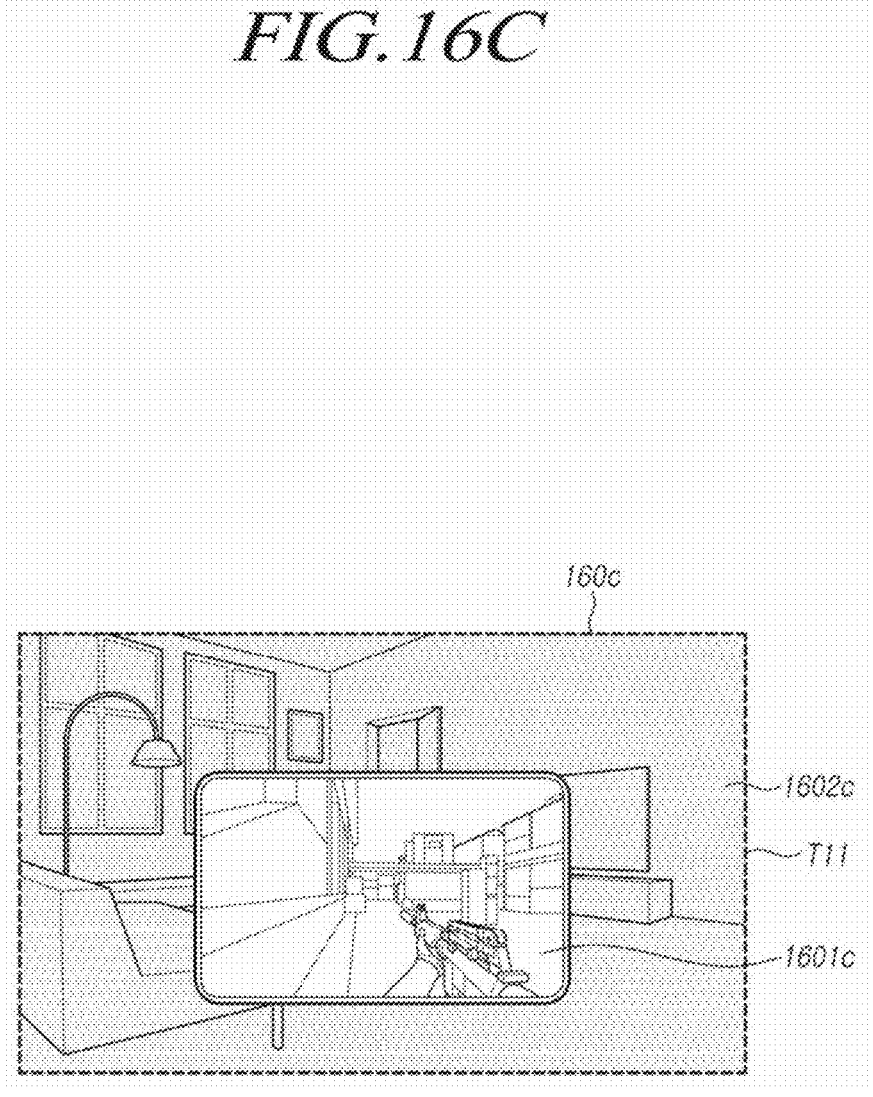

The partial display screen 160*a* of FIG. 16C may be a VST screen in which the visual effect (e.g., blue light) is applied to the masking area T11 selecting the entire real screen 1602*c*, and the visual effect (e.g., blue light) is not applied to the virtual screen 1601*c*.

Figure 16D:
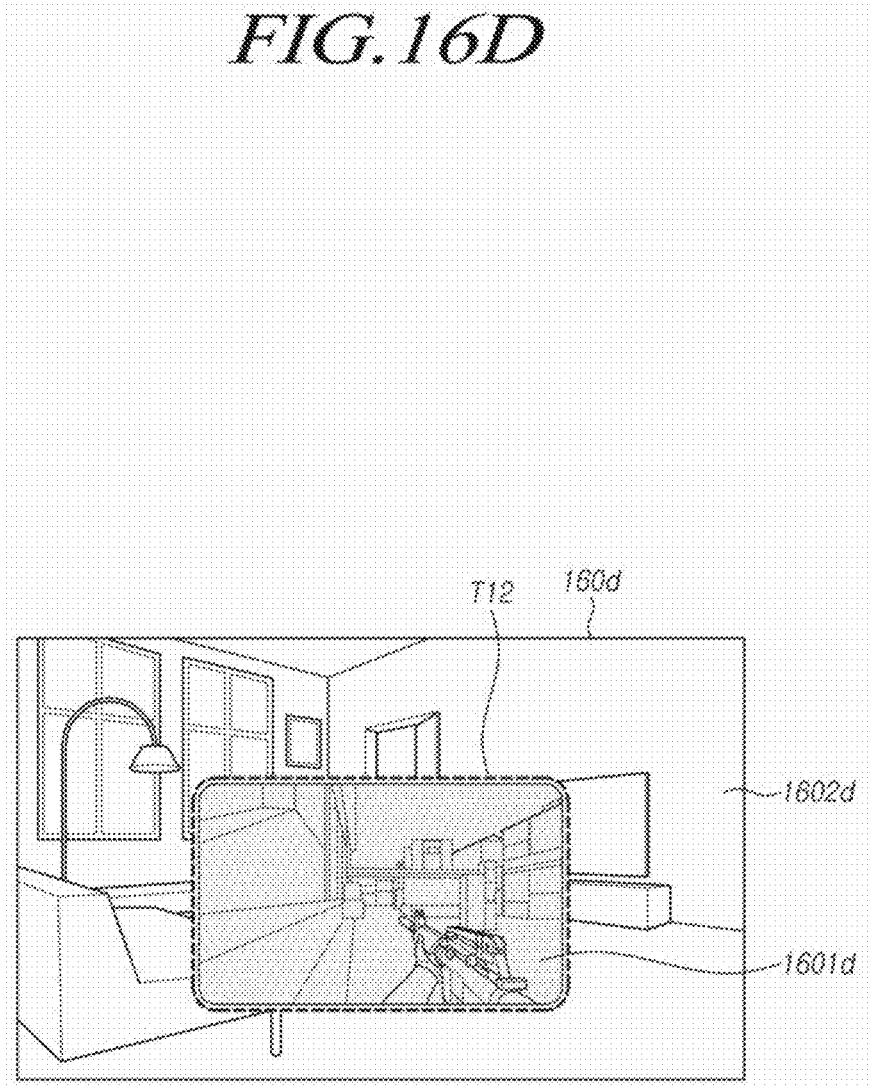

The partial display screen 160*d* of FIG. 16D may be a VST screen in which the visual effect (e.g., blue light) is applied to the masking area T12 selecting the entire virtual screen 1601*c* without applying the visual effect (e.g., blue light) to the entire real screen 1602*d*.

Figure 16E:
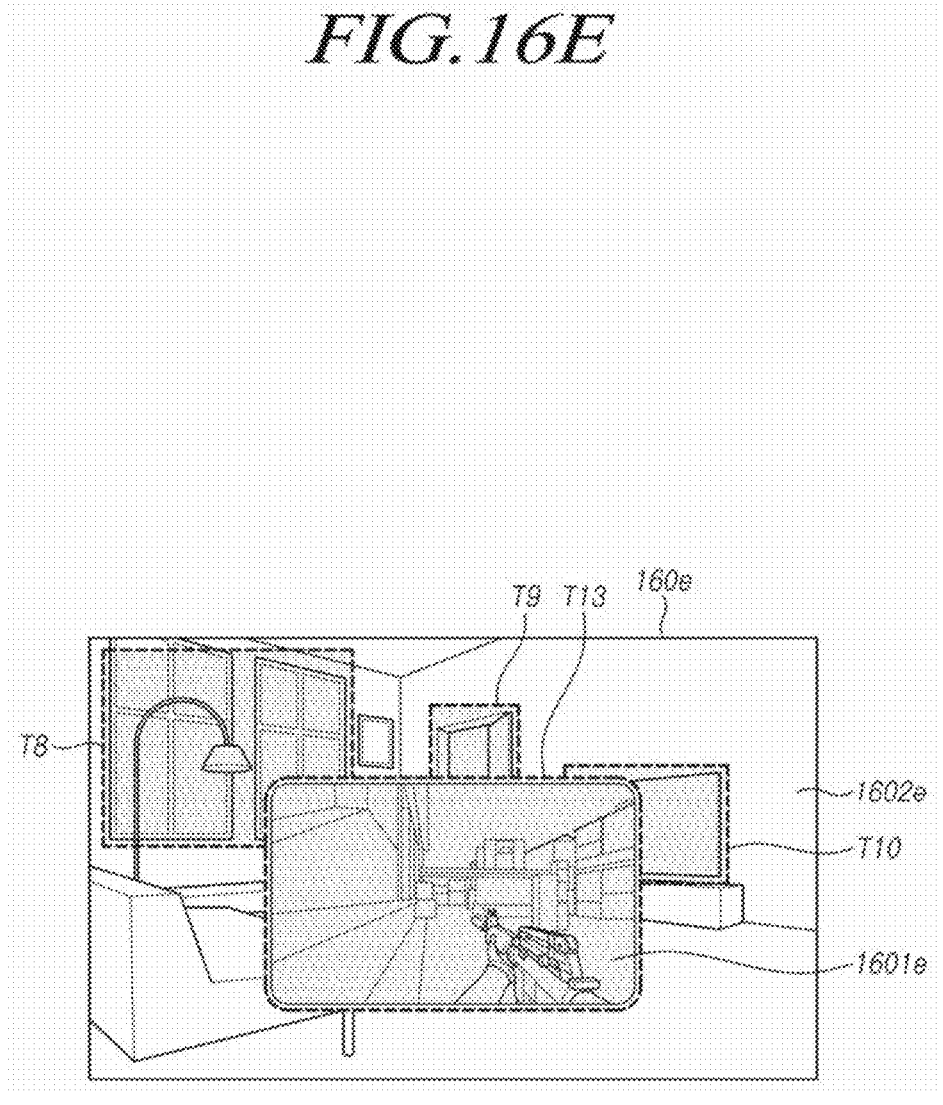

The partial display screen 160*e* of FIG. 16E may be a VST screen obtained by differentially applying the visual effect (e.g., blue light) to the masking area (T8, T9, and T10) selected for light emitting objects included in the real screen 1602*e* and the masking area T13 selected for the entire virtual screen 1601*e*.

Figure 16F:
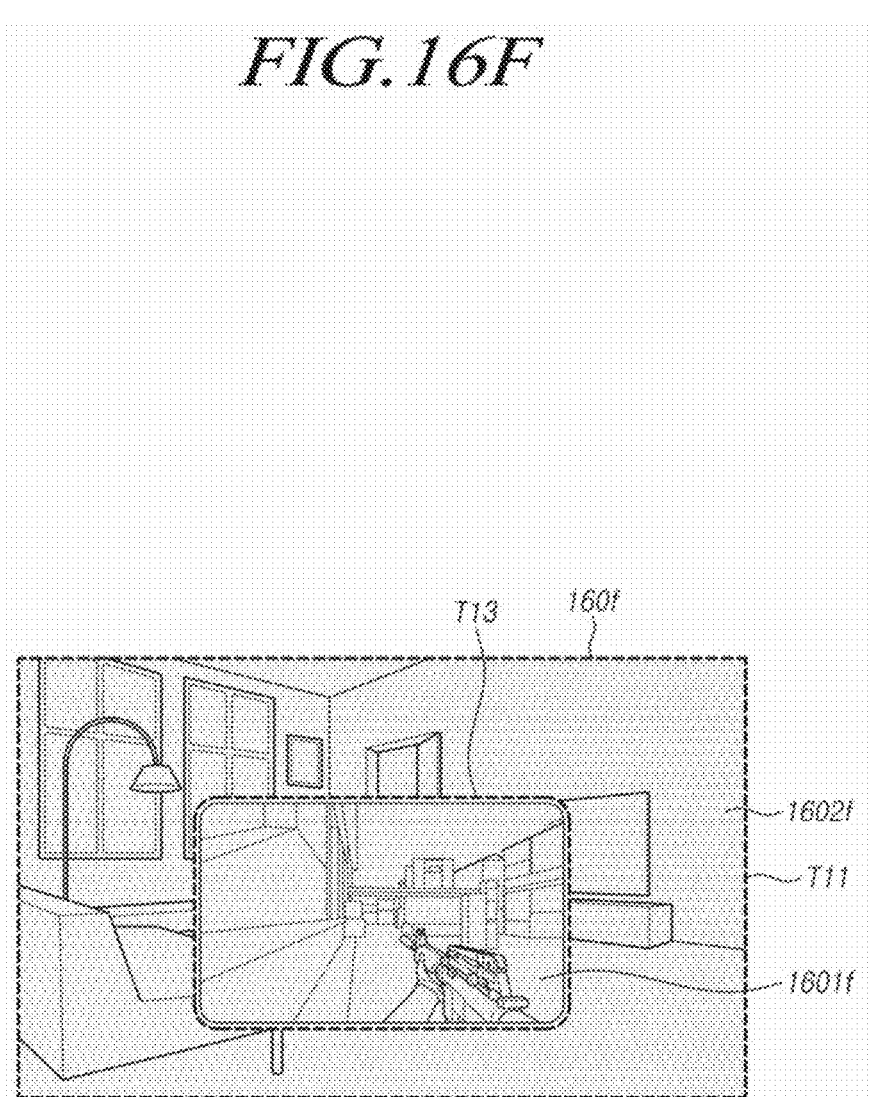

The partial display screen 160*f* of FIG. 16F may be a VST screen in which the visual effect (e.g., blue light) is applied to the masking area T11 selecting the entire real screen 1602*f* and the masking area T13 selecting the entire virtual screen 1601*f*.

Figure 17:
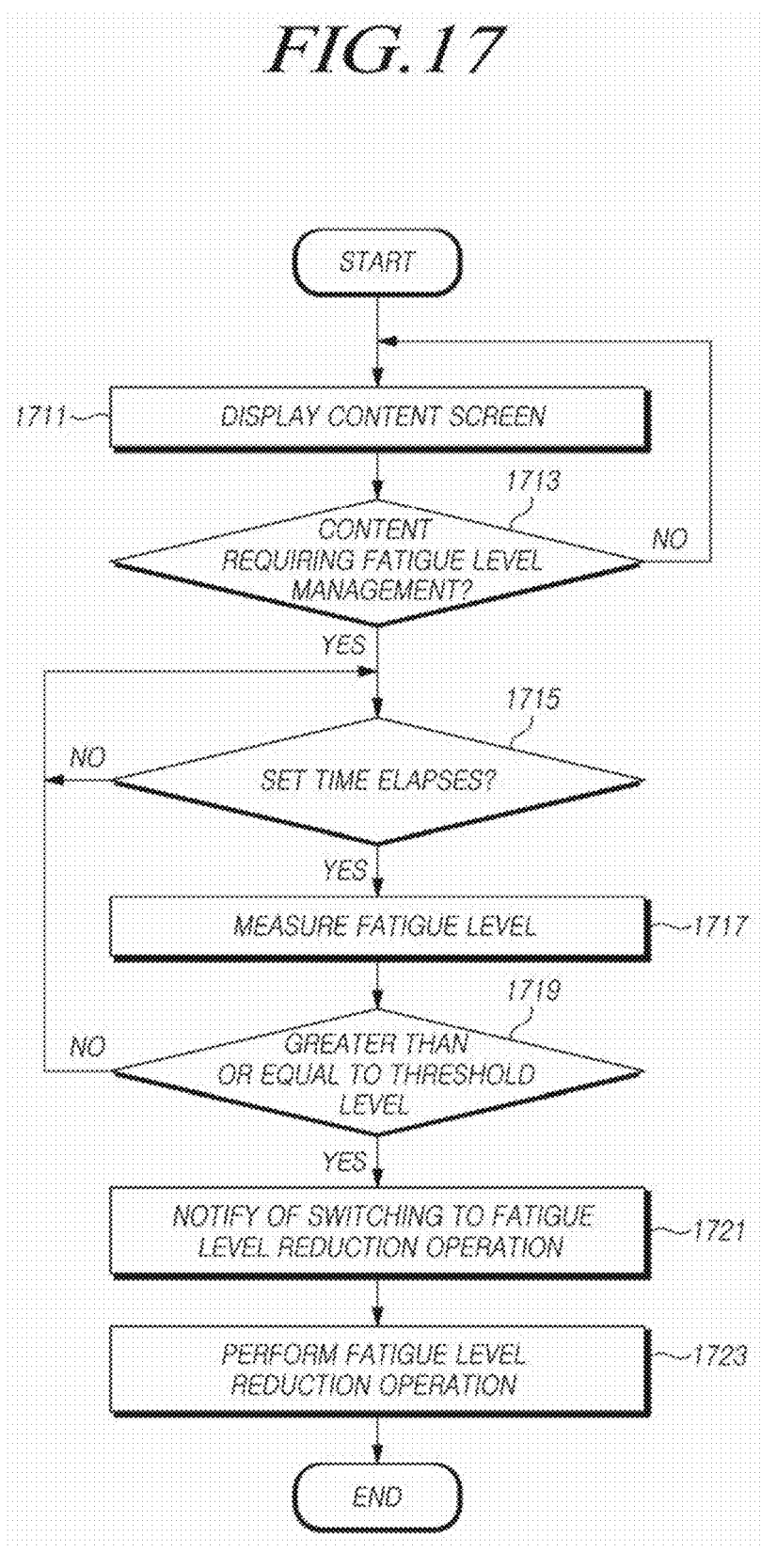
FIG. 17 is a control flowchart illustrating an example process for inducing sleep onset in an electronic device according to one or more embodiments.

FIG. 17 is a control flowchart illustrating an example process for inducing sleep onset in an electronic device (e.g., the HMD device 10 of FIG. 1) according to one or more embodiments.

Referring to FIG. 17, in operation 1711, the electronic device 10 may output a content screen through a display. The content screen may be a virtual screen according to a content service. The content screen may be a full display screen that outputs the virtual screen to the entire area of the display.

In operation 1713, the electronic device 10 may determine whether the content service outputting the virtual screen corresponds to content where the fatigue level of the user 20 needs to be managed. The fatigue level of the user 20 may be, for example, eye fatigue level. The content requiring fatigue level management may include, for example, game content or movie content having high visual stimulation to the user 20, such as a flash.

If the content requires fatigue level management, the electronic device 10 may determine whether a set time has elapsed in operation 1715. The set time may determine a period for measuring the fatigue level. The set time may be, for example, 30 minutes. In this case, the electronic device 10 may obtain the amount of change in fatigue level by measuring the fatigue level every 30 minutes.

When the set time elapses, the electronic device 10 may measure the fatigue level of the user 20 in operation 1717. The electronic device 10 may obtain a fatigue level change according to the measured fatigue level. The electronic device 10 may measure a change in fatigue level of the user 20 considering biometric information provided from an external device (e.g., the smartphone 30 or the wearable device 40 of FIG. 1). The electronic device 10 may evaluate the weighted fatigue level in real time based on the amount of change in the fatigue level. The electronic device 10 may measure fatigue level aperiodically as well as periodically. For example, the electronic device 10 may measure the fatigue level of the user 20 when an abnormal behavior, such as when the user 20 suddenly lifts the head up and down, is detected.

In operation 1719, the electronic device 10 may determine whether the amount of change in fatigue level is greater than or equal to a threshold level. For example, the electronic device 10 may determine whether the number of blinks of the user 20 has increased by a predetermined number or more. For example, the electronic device 10 may determine whether the eye closed duration of the user 20 has increased for a predetermined time. For example, the electronic device 10 may determine whether the pupil diameter of the user 20 is increased by a predetermined size. For example, the electronic device 10 may determine whether the eyeball surface temperature of the user 20 has increased by a predetermined value or more. For example, the electronic device 10 may determine whether the HRV of the user 20 has increased by at least a predetermined level. The electronic device 10 may determine that the fatigue level has increased when an amount of change capable of predicting an abnormal level occurs in at least one or more items (e.g., the number of blinks, the closed eyes duration, or the pupil diameter) for measuring the fatigue level.

If it is determined that the amount of change in the fatigue level is equal to or larger than the threshold level, the electronic device 10 may provide a notification suggesting to switch to the fatigue level minimize mode in which the fatigue level reduction operation is to be performed to the user 20 in operation 1721. The electronic device 10 may provide a notification to the user 20 using visual information and/or auditory information. For example, the electronic device 10 may output, through the display, the guide message "The fatigue level is high. Do you want to run fatigue level minimize mode?"

If the user 20 requests to switch to the fatigue level minimize mode in response to the guide message 1813a, the electronic device 10 may switch to the fatigue level minimize mode to perform a fatigue level reduction operation in operation 1723. For example, the electronic device 10 may output a button (e.g., the "Yes" button 1815a of FIG. 18A) instructing to switch to the fatigue level minimize mode and/or a button (e.g., the "No" button 1817a of FIG. 18A) instructing not to switch to the fatigue level minimize mode through the display. If the "Yes" button 1815a is selected by performing interaction with the user 20, the electronic device 10 may determine that the user 20 has requested to switch to the fatigue level minimize mode, and switch to the fatigue level minimize mode to perform the operation for reducing fatigue level.

According to one or more embodiments, if switching to the fatigue level minimize mode is executed, the electronic device 10 may activate sleep onset preparation step 1 (e.g., sleep onset preparation start time). If sleep onset preparation step 1 is activated, the electronic device 10 may switch from the full display mode (VR mode) to the partial display mode (VST mode) (e.g., see FIG. 18A). The full display mode (VR mode) may be a display mode in which the full display screen (VR screen) displaying the virtual screen according to the content service is displayed on the entire area of the display. The partial display mode (VST mode) may be the display mode in which the composite screen (VST screen) obtained by synthesizing the virtual screen according to the content service with the real screen is displayed on the entire area of the display.

According to one or more embodiments, when the time reaches step switching time, the electronic device 10 may activate sleep onset preparation step 2. If sleep onset preparation step 2 is activated, the electronic device 10 may analyze the attributes of objects included in the screen. The electronic device 10 may differently apply the visual effect to the virtual object (e.g., the object detected on the virtual screen (rendered image)) or the real object (e.g., the object detected on the real screen (photographed image)) according to the attributes of the objects (e.g., refer to FIG. 18B). The electronic device 10 may adjust the visual effect (e.g., blue light and/or illuminance) on the virtual object or may differentially adjust the visual effect (e.g., blue light and/or illuminance) on the real object. For example, the electronic device 10 may divide light emitting objects among real objects and may differentially adjust the visual effect (e.g., blue light and/or illuminance) of the masking area (T14, T15, T16, or T17) for each type (e.g., the natural light source, the artificial light source, or the real display) of the light emitting object. The masking area (T14, T15, T16, or T17) may be an area set to apply a visual effect (e.g., adjust blue light or illuminance) to each light emitting object. The electronic device 10 may apply a visual effect (e.g., blue light and/or illuminance) to the masking area of the remaining real object except for the light emitting object among the real objects or the entire area (e.g., the masking area T18 of FIG. 18B) of the real screen (e.g., the real screen 1822 of FIG. 18B). The electronic device 10 may apply a visual effect (e.g., blue light and/or illuminance) to the entire area (e.g., the masking area T19 of FIG. 18B) of the virtual screen (e.g., the virtual screen 1821 of FIG. 18B).

Figure 18A:
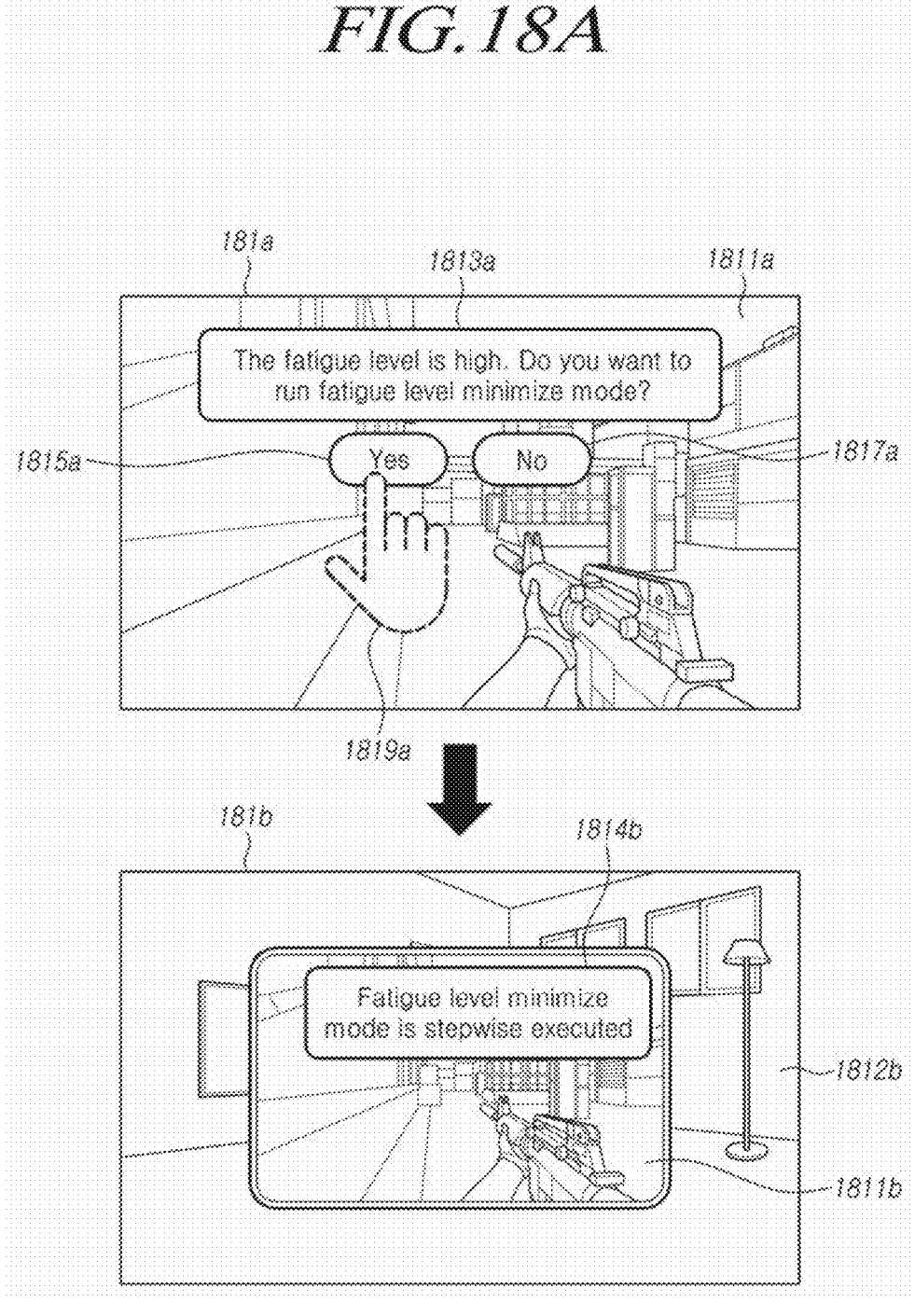
FIG. 18A is a view illustrating an example screen to which a visual effect applies in sleep onset preparation step 1 in an electronic device according to one or more embodiments.

FIG. 18A is a view illustrating an example screen to which a visual effect applies in sleep onset preparation step 1 in an electronic device (e.g., the HMD device 10 of FIG. 1) according to one or more embodiments.

Referring to FIG. 18A, if sleep onset preparation step 1 is activated (e.g., the sleep onset preparation start time), the electronic device 10 may display, through the display, a full display screen 181a including the guide manipulation guide 1813a "The fatigue level is high. Do you want to run fatigue level minimize mode?" and a button (e.g., "Yes" button) 1815a for instructing execution and/or a button (e.g., "No" button) 1817a for instructing not to execute, overlapping the virtual screen 1811a. The electronic device 10 may select one of the "Yes" button 1815a or the "No" button 1817a by interaction with the user 20 (1819a).

If the "Yes" button 1815a is selected by the user 20, the electronic device 10 may switch the full display screen 181a (e.g., VR screen) to the partial display screen 181b (e.g., VST screen). The partial display screen 181b may be a screen obtained by synthesizing (e.g., incorporating or combining) the virtual screen 1811b according to the content service with the real screen 1812b based on the captured image. The real screen 1812b or the virtual screen 1811b may include the guide message 1814b "The fatigue level minimize mode is executed in a stepwise manner." The guide message 1814b may be displayed over the real screen 1812b and the virtual screen 1811b.

Figure 18B:
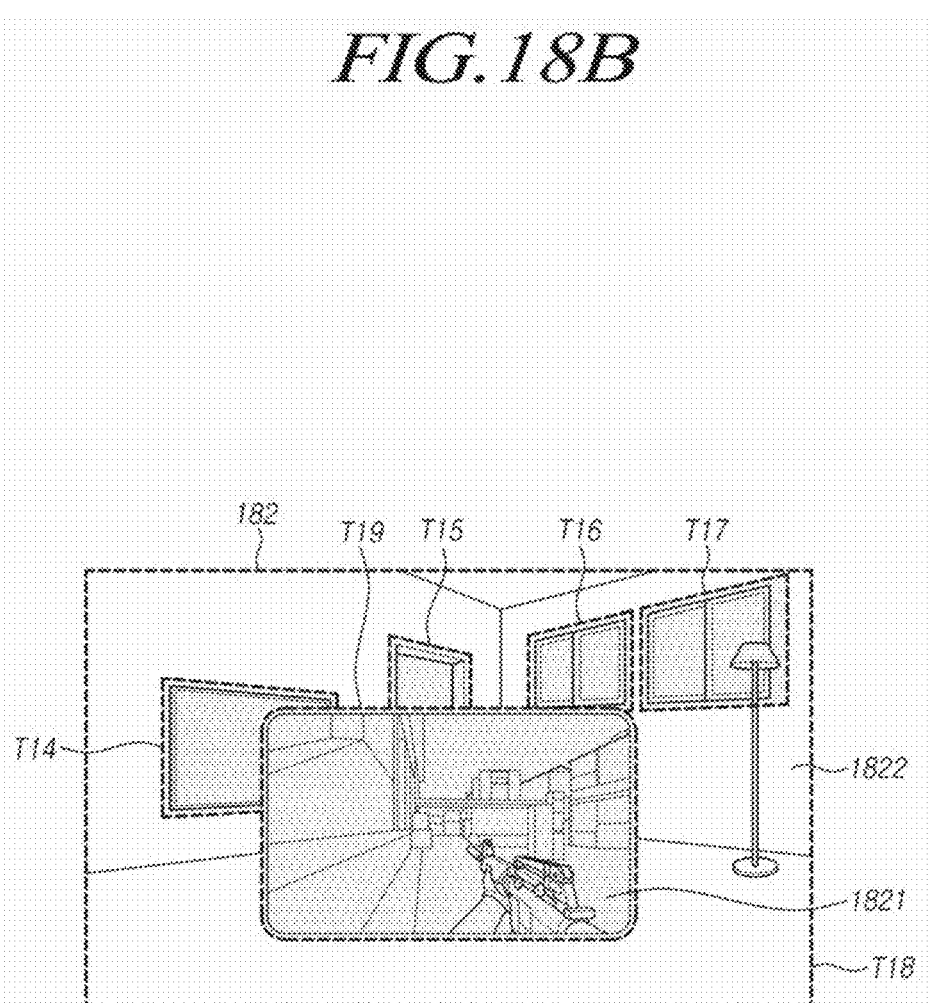
FIG. 18B is a view illustrating an example in which a visual effect applies to each object in an electronic device according to one or more embodiments.

FIG. 18B is a view illustrating an example in which a visual effect applies to each object in an electronic device (e.g., the HMD device 10 of FIG. 1) according to one or more embodiments.

Referring to FIG. 18B, in sleep onset preparation step 3, a visual effect (e.g., blue light and/or illuminance) may be differentially applied to the masking areas (T14, T15, T16, T17, T18, and T19) selecting target objects according to attributes. For example, the first masking area T14 selects a TV (real display light) which is one of the light emitting objects included in the real screen 1822, the second masking area T15 selects an entrance door (other indoor space light) which is one of the light emitting objects included in the real screen 1822, and the third masking area T16 and the fourth masking area T17 select two (2) windows (natural light) arranged side by side which are one of the light emitting objects included in the real screen 1822. The fifth masking area T18 selects the entire real screen 1822, and the sixth masking area T19 selects the entire virtual area 1821.

For example, illuminance and/or blue light may be differentially applied to the first to fourth masking areas (T14, T15, T16, and T17) selecting light emitting objects on the real screen 1822. For example, blue light and/or illuminance may be selectively and/or applied, in a stepwise manner, to the fifth masking area T5 selecting the entire area of the real screen 1822 and/or the sixth masking area T6 selecting the entire area of the virtual screen 1821.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

In the disclosure, the above-described description has been made mainly of specific embodiments, but the disclosure is not limited to such specific embodiments, but should rather be appreciated as covering all various modifications, equivalents, and/or substitutes of various embodiments.

What is claimed is:

1. A method performed by a head mounted display (HMD) device, the method comprising:
   determining a sleep onset preparation start time; and
   displaying, on a display, a sleep onset preparation screen to which a visual effect is applied, from the sleep onset preparation start time, in a stepwise manner during a sleep onset preparation time interval,
   wherein the visual effect that is applied in the stepwise manner comprises a visual effect of switching a virtual screen output through an entire display area of the display to a video see through (VST) screen by increasing a depth of the virtual screen in the VST screen such that the virtual screen has an effect of moving away from a user wearing the HMD device, wherein the VST screen displays the virtual screen with a non-virtual screen as a background in the entire display area of the display,
   wherein the non-virtual screen is based on an image captured through a front camera, and
   wherein the virtual screen is based on content executed by the HMD device.

2. The method of claim 1, wherein the determining the sleep onset preparation start time comprises:
   measuring a fatigue level for the user; and
   determining the sleep onset preparation start time based on a determination that the fatigue level satisfies a predetermined threshold level.

3. The method of claim 2, wherein the measuring the fatigue level comprises:
   performing a first measurement operation of measuring a duration in which eyes of the user are closed;
   performing a second measurement operation of measuring a number of blinks of the user,
   performing a third measurement operation of measuring a pupil diameter of the user;
   performing a fourth measurement operation of measuring an eyeball surface temperature of the user;
   performing a fifth measurement operation of measuring a heart rate variability of the user; and
   obtaining, based on at least one of the duration in which the eyes of the user are closed, the number of blinks, the pupil diameter, the eyeball surface temperature, or the heart rate variability, a fatigue level value indicating a level of the fatigue level.

4. The method of claim 2, wherein the determining the sleep onset preparation start time further comprises:
   obtaining the sleep onset preparation start time based on (i) at least one of a sleep onset target time or a wake-up target time of the user and (ii) the sleep onset preparation time interval, or
   obtaining the sleep onset preparation start time based on sleep data of the user, and
   wherein the visual effect is applied in the stepwise manner during the sleep onset preparation time interval.

5. The method of claim 2, wherein applying, in the stepwise manner, the visual effect during the sleep onset preparation time interval comprises:
   displaying, through the display, a message indicating whether to start to prepare for sleep onset at the sleep onset preparation start time; and
   determining whether to apply, in the stepwise manner, the visual effect based on interaction with the user.

6. The method of claim 1, wherein the visual effect applied in the stepwise manner comprises at least one of a visual effect in which a proportion of the virtual screen occupied in the VST screen is reduced, in the stepwise manner, during the sleep onset preparation time interval or a visual effect in which a preset background screen is displayed over time during the sleep onset preparation time interval instead of the non-virtual screen.

7. The method of claim 1, wherein the visual effect applied in the stepwise manner comprises:
   a visual effect of displaying the VST screen in which blue light is differentially adjusted for each object in the VST screen based on an attribute of one or more objects included in the VST screen; or
   a visual effect of displaying the VST screen in which illuminance is differentially adjusted for each object in the VST screen based on the attribute of the one or more objects included in the VST screen, and wherein the attribute of the one or more objects included in the VST screen comprises at least one of a first indicator indicating one of the non-virtual screen or the virtual screen including a corresponding object, a second indicator indicating whether the corresponding object emits light, or a third indicator indicating a light source type of the corresponding object.

8. A head mounted display (HMD) device comprising:

at least one memory storing one or more instructions;

at least one sensor;

at least one camera;

a display; and at least one processor comprising a processing circuit, the at least one processor operatively coupled to the to the at least one sensor, the at least one camera, the display, and the at least one memory, wherein the one or more instructions, when executed by the at least one processor, cause the HMD device to:

determine a sleep onset preparation start time, display, on the display, a sleep onset preparation screen to which a visual effect is applied, from the sleep onset preparation start time, in a stepwise manner during a sleep onset preparation time interval, wherein the visual effect that is applied in the stepwise manner comprises a visual effect of switching a virtual screen output through an entire display area of the display to a video see through (VST) screen by increasing a depth of the virtual screen in the VST screen such that the virtual screen has an effect of moving away from a user wearing the HMD device, wherein the VST screen displays the virtual screen with a non-virtual screen as a background in the entire display area of the display, wherein the non-virtual screen is based on an image captured through a front camera, and wherein the virtual screen is based on content executed by the HMD device.

9. The HMD device of claim 8, wherein the one or more instructions, when executed by the at least one processor, further cause the HMD device to:

measure a fatigue level of the user based on information collected from at least one of the at least one sensor or the at least one camera, and determine the sleep onset preparation start time based on a determination that the fatigue level satisfies a predetermined threshold level.

10. The HMD device of claim 9, wherein the one or more instructions, when executed by the at least one processor, further cause the HMD device to:

measure a duration in which eyes of the user are closed, measure a number of blinks of the user, measure a pupil diameter of the user, measure an eyeball surface temperature of the user, or measure a heart rate variability of the user, and obtain, based on at least one of the duration in which the eyes of the user are closed, the number of blinks, the pupil diameter, the eyeball surface temperature, or the heart rate variability, a fatigue level value indicating a level of fatigue of the user.

11. The HMD device of claim 9, wherein the one or more instructions, when executed by the at least one processor, further cause the HMD device to:

obtain the sleep onset preparation start time based on a sleep onset target time or a wake-up target time of the user, or determine the sleep onset preparation start time based on (i) at least one of the sleep onset target time or the wake-up target time and (ii) the sleep onset preparation time interval, and wherein the visual effect is applied in the stepwise manner during the sleep onset preparation time interval.

12. The HMD device of claim 9, wherein the one or more instructions, when executed by the at least one processor, further cause the HMD device to obtain the sleep onset preparation start time based on sleep data of the user.

13. The HMD device of claim 9, wherein the at least one processor is configured to:

control the display to display, through the display, a message indicating whether to start to prepare for sleep onset at a time when the sleep onset preparation start time arrives; and determine whether to apply, in the stepwise manner, the visual effect based on interaction with the user using the at least one sensor or the at least one camera.

14. The HMD device of claim 8, wherein the one or more instructions, when executed by the at least one processor, further cause the HMD device to:

control the display to reduce, in the stepwise manner, a proportion of the virtual screen occupied in the VST screen during the sleep onset preparation time interval, or display a preset background screen over time during the sleep onset preparation time interval instead of the non-virtual screen.

15. The HMD device of claim 8, wherein the one or more instructions, when executed by the at least one processor, further cause the HMD device to:

control the display to display the VST screen in which blue light is differentially adjusted for each object in the VST screen based on an attribute of one or more objects included in the VST screen, or to display the VST screen in which illuminance is differentially adjusted for each object in the VST screen based on the attribute of the one or more objects included in the VST screen, wherein the attribute of the one or more objects included in the VST screen comprises at least one of a first indicator indicating one of the non-virtual screen or the virtual screen including a corresponding object, a second indicator indicating whether the corresponding object emits light, or a third indicator indicating a light source type of the corresponding object.

16. A non-transitory computer readable medium having instructions stored therein, which when executed by a processor in a head mounted display (HMD) device cause the processor to execute a method comprising:

determining a sleep onset preparation start time; and displaying, on a display, a sleep onset preparation screen to which a visual effect is applied, from the sleep onset preparation start time, in a stepwise manner during a sleep onset preparation time interval, wherein the visual effect that is applied in the stepwise manner comprises a visual effect of switching a virtual screen output through an entire display area of the display to a video see through (VST) screen by increasing a depth of the virtual screen in the VST screen such that the virtual screen has an effect of moving away from a user wearing the HMD device, wherein the VST screen displays the virtual screen with a non-virtual screen as a background in the entire display area of the display, wherein the non-virtual screen is based on an image captured through a front camera, and wherein the virtual screen is based on content executed by the HMD device.

17. The non-transitory computer readable medium of claim 16, wherein the determining the sleep onset preparation start time comprises:

measuring a fatigue level for the user, and determining the sleep onset preparation start time based on a determination that the fatigue level is greater than or equal to a predetermined threshold level.

18. The non-transitory computer readable medium of claim 17, wherein the measuring the fatigue level comprises:

performing a first measurement operation of measuring a duration in which eyes of the user are closed, performing a second measurement operation of measuring a number of blinks of the user, performing a third measurement operation of measuring a pupil diameter of the user, performing a fourth measurement operation of measuring an eyeball surface temperature of the user, performing a fifth measurement operation of measuring a heart rate variability of the user, and obtaining, based on at least one of the duration in which the eyes of the user are closed, the number of blinks, the pupil diameter, the eyeball surface temperature, or the heart rate variability, a fatigue level value indicating a level of the fatigue level for determining whether the fatigue level is greater than or equal to the predetermined threshold level.

19. The non-transitory computer readable medium of claim 17, wherein the determining the sleep onset preparation start time further comprises:

obtaining the sleep onset preparation start time based on (i) at least one of a sleep onset target time or a wake-up target time of the user and (ii) the sleep onset preparation time interval, or obtaining the sleep onset preparation start time based on sleep data of the user, and wherein the visual effect is applied in the stepwise manner during the sleep onset preparation time interval.

20. The non-transitory computer readable medium of claim 16, wherein the visual effect applied in the stepwise manner comprises at least one of a visual effect in which a proportion of the virtual screen occupied in the VST screen is reduced, in the stepwise manner, during the sleep onset preparation time interval or a visual effect in which a preset background screen is displayed during the sleep onset preparation time interval instead of the non-virtual screen.

* * * * *